(12) United States Patent (10) Patent No.: US 12,628,172 B2
Zheng et al. (45) Date of Patent: May 12, 2026

(54) CONTROL INFORMATION TRANSMISSION METHOD, APPARATUS, AND SYSTEM

(71) Applicant: HUAWEI TECHNOLOGIES CO., LTD., Shenzhen (CN)

(72) Inventors: Juan Zheng, Beijing (CN); Chaojun Li, Beijing (CN); Hailong Hou, Beijing (CN); Yongqiang Fei, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 532 days.

(21) Appl. No.: 17/961,126

(22) Filed: Oct. 6, 2022

(65) Prior Publication Data

US 2023/0031932 A1     Feb. 2, 2023

Related U.S. Application Data

(63) Continuation of application No. PCT/CN2021/085929, filed on Apr. 8, 2021.

(30) Foreign Application Priority Data

Apr. 10, 2020    (CN) .......................... 202010280705.9

(51) Int. Cl.
  *H04W 72/23*      (2023.01)
  *H04L 5/00*       (2006.01)

(52) U.S. Cl.
  CPC ........... *H04W 72/23* (2023.01); *H04L 5/0094* (2013.01)

(58) Field of Classification Search
  CPC .................................................... H04W 72/23
  See application file for complete search history.

(56) References Cited

U.S. PATENT DOCUMENTS

| | | | |
|---|---|---|---|
| 10,454,698 B1 | 10/2019 | Banerjee et al. | |
| 2019/0110290 A1* | 4/2019 | Sun ........................ | H04W 24/08 |
| 2019/0158205 A1* | 5/2019 | Sheng ................... | H04L 5/0048 |
| 2019/0268207 A1* | 8/2019 | Al-Imari ............... | H04L 5/0053 |
| 2020/0092864 A1 | 3/2020 | Chen | |
| 2020/0260424 A1 | 8/2020 | Guo et al. | |
| 2021/0058947 A1* | 2/2021 | Lin ........................ | H04W 72/04 |
| 2021/0127367 A1* | 4/2021 | Yi ......................... | H04W 72/23 |

(Continued)

FOREIGN PATENT DOCUMENTS

| | | |
|---|---|---|
| CN | 109152023 A | 1/2019 |
| CN | 109451795 A | 3/2019 |

(Continued)

OTHER PUBLICATIONS

Huawei, "Summary of 7.2.6.1.1 Potential Enhancements to PDCCH," 3GPP TSG RAN WG1 Meeting #96, R1-1903349, Athens, Greece, Feb. 25-Mar. 1, 2019, 37 pages.

(Continued)

*Primary Examiner* — Jason E Mattis
(74) *Attorney, Agent, or Firm* — Fish & Richardson P.C.

(57)     ABSTRACT

This application provide a control information transmission method, an apparatus, and a system. One example method includes: A first terminal device receives, from a network device, DCI used for indicating a BWP. A quantity of bits in the DCI is a fixed quantity of bits. The DCI is used for scheduling a physical data channel. The BWP is used to transmit the physical data channel.

18 Claims, 3 Drawing Sheets

```
┌──────────────┐              ┌──────────────┐
│   Network    │              │ First terminal│
│   device     │              │   device     │
└──────────────┘              └──────────────┘
       │                             │
       │   301: Send DCI to the      │
       │   first terminal device     │
       └ ─ ─ ─ ─ ─ ─ ─ ─ ─ ─ ─ ─ ─ ▶ │
                          ┌──────────────────────────┐
                          │ 302: Schedule a physical data│
                          │ channel based on the DCI │
                          └──────────────────────────┘
       │                             │
```

(56)　　　　　　References Cited

U.S. PATENT DOCUMENTS

2022/0191882 A1* 6/2022 Lee ........................ H04W 72/56
2022/0264461 A1* 8/2022 Chen ................. H04W 72/0446

FOREIGN PATENT DOCUMENTS

CN　　　　110493874 A　11/2019
WO　　　　2019086012 A1　　5/2019

OTHER PUBLICATIONS

Ericsson, "New SID on Support of Reduced Capability NR Devices,"
3GPP TSG RAN Meeting #86, RP-193238, Sitges, Spain, Dec.
9-12, 2019, 5 pages.
International Search Report and Written Opinion in International
Appln. No. PCT/CN2021/085929, mailed on Jun. 30, 2021, 17
pages (with English translation).
Samsung, "Remaining Issues on BWP and CA," 3GPP TSG RAN
WG1 Meeting #94bis, R1-1810845, Chengdu, China, Oct. 8-12,
2018, 3 pages.
3GPP TS 38.212 V16.1.0, "3rd Generation Partnership Project;
Technical Specification Group Radio Access Network; NR; Multi-
plexing and channel coding (Release 16)," Mar. 2020, 146 pages.
Extended European Search Report in European Appln No. 21784561.
9, dated Jul. 4, 2023, 13 pages.

* cited by examiner

CONTROL INFORMATION TRANSMISSION METHOD, APPARATUS, AND SYSTEM

CROSS-REFERENCE TO RELATED APPLICATIONS

This application is a continuation of International Application No. PCT/CN2021/085929, filed on Apr. 8, 2021, which claims priority to Chinese Patent Application No. 202010280705.9, filed on Apr. 10, 2020. The disclosures of the aforementioned applications are hereby incorporated by reference in their entireties.

TECHNICAL FIELD

The present application relates to the field of communication technologies, and in particular, to a control information transmission method, an apparatus, and a system.

BACKGROUND

With rapid development of a 5th generation (5G) mobile communication new radio (NR) technology, services such as an enhanced mobile broadband (eMBB) service, an ultra-reliable low-latency communication (URLLC) service, and a massive machine-type communications (mMTC) service are successively proposed. To help large-scale application of the foregoing services, most terminal devices require low costs.

SUMMARY

In view of this, an objective of embodiments of this application is to provide a control information transmission method, an apparatus, and a system, so as to avoid a technical problem that when a terminal device performs BWP switching, a large quantity of DCI formats are detected, detection complexity is high, and power consumption is high, which is not helpful in power saving.

To achieve the foregoing objective, the following technical solutions are used in embodiments of this application.

According to a first aspect, an embodiment of this application provides a control information transmission method. The method may be performed by a network device, a chip, or another apparatus. The method may include, sending, to a first terminal device, DCI used for indicating a BWP. A quantity of bits in the DCI is a fixed quantity of bits. The DCI is used for scheduling a physical data channel. The BWP is used to transmit the physical data channel.

Based on the first aspect, the quantity of bits in the DCI that is sent by the network device to the first terminal device and that is used for indicating the BWP is fixed, so that when performing blind detection on the DCI sent by the network device, the first terminal device performs blind detection by using a detection apparatus with the fixed quantity of bits. In this way, data transmission efficiency is ensured, and a quantity of sizes of the DCI detected by the first terminal device can be reduced, so that a quantity of times that the first terminal device performs blind detection on the DCI is reduced, and detection complexity is reduced. Therefore, power consumption of the first terminal device is reduced, and an objective of power saving is achieved. This helps large-scale application of a service related to the first terminal device.

In a possible design, with reference to the first aspect, that a quantity of bits in the DCI is a fixed quantity of bits includes: the quantity of bits in the DCI is predefined; the quantity of bits in the DCI is determined based on a maximum bandwidth supported by the first terminal device; the quantity of bits in the DCI is determined based on a bandwidth of a control-resource set (CORESET) #0; or the quantity of bits in the DCI is aligned with or the same as a quantity of bits in DCI used for scheduling common information, where the common information includes a system message, a paging message, or a random access response (RAR).

Based on this possible design, in this embodiment of this application, the quantity of bits in the DCI used for indicating the BWP may be predefined, may be determined based on the maximum bandwidth supported by the first terminal device; may be determined based on the bandwidth of the CORESET #0; may be determined based on the DCI used for scheduling the common information; or may be determined in another manner. This is not limited. This provides a feasible solution for the network device to determine the quantity of bits in the DCI used for indicating the BWP.

In a possible design, with reference to the first aspect or the possible designs of the first aspect, the DCI includes a DAI field used for indicating the BWP. Alternatively, the DCI does not include a downlink assignment index (DAI) field.

In a possible design, with reference to the first aspect or the possible designs of the first aspect, the method further includes: determining, in a static codebook manner, a hybrid automatic repeat request (HARQ) feedback performed by the first terminal device to a downlink physical data channel transmitted in a transmission window of the downlink physical data channel.

Based on the foregoing two possible designs, all bits in the DAI field in the DCI may be used for indicating the BWP, and the bits used for indicating the BWP may continue to be referred to as the DAI field. In this case, the quantity of bits used for indicating the BWP may be fixed. To be specific, the quantity of bits used for indicating the BWP is all the bits in the foregoing DAI field.

Alternatively, the bits used for indicating the BWP may be referred to as another field, for example, referred to as a BWP indication field. In this case, the DCI does not include the DAI field. The quantity of bits used for indicating the BWP may be fixed. To be specific, the quantity of bits used for indicating the BWP is all the bits in the foregoing DAI field.

When all the bits in the DAI field in the DCI are used for indicating the BWP, the hybrid automatic repeat request (HARQ) feedback performed by the first terminal device to the downlink physical data channel transmitted in the transmission window of the downlink physical data channel may be determined in the static codebook manner. When impact on a codebook fed back by the first terminal device is reduced, it is ensured that the quantity of bits in the DCI is aligned with the quantity of bits in the DCI for scheduling transmission of the common information, so that detection complexity is reduced, and power consumption of the first terminal device is further reduced.

In addition, the DCI may further include a first indication field. The first indication field indicates the quantity of bits used for indicating the BWP, so that after receiving the DCI, the first terminal device can determine, based on the first indication field, the quantity of bits used for indicating the BWP. Alternatively, a quantity of bits in the first indication field may be fixed. Optionally, the first indication field may be a part of the bits used for indicating the BWP.

In a possible design, with reference to the first aspect or the possible designs of the first aspect, the DCI includes a downlink assignment index (DAI) field. The DAI field includes M1 bits. M2 bits in the M1 bits are used for indicating the BWP. M1 is a quantity of bits used to send the DAI field to a second terminal device.

In a possible design, with reference to the first aspect or the possible designs of the first aspect, M1-M2 bits in the DAI field are used for indicating, to the first terminal device, a quantity of downlink physical data channels transmitted in a transmission window of the downlink physical data channel. "–" indicates a minus sign.

Based on the foregoing two possible designs, a part of bits in the DAI field in the DCI may be used for indicating the BWP, and the bits used for indicating the BWP may continue to be referred to as the DAI field. In this case, the part of bits in the DAI field are used for indicating the BWP, and the other part of bits are used for indicating, to the first terminal device, the quantity of downlink physical data channels transmitted in the transmission window of the downlink physical data channel.

A fixed quantity of bits may be selected from the DAI field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. The first indication field may be a part of bits in the DAI field.

In a possible design, with reference to the first aspect or the possible designs of the first aspect, the DCI includes a downlink assignment index (DAI) field and a BWP indication field. The DAI field includes M1-M2 bits. The BWP indication field includes M2 bits. The BWP indication field is used for indicating the BWP. The DAI field is used for indicating, to the first terminal device, a quantity of downlink physical data channels transmitted in a transmission window of the downlink physical data channel. M1 is a quantity of bits used to send the DAI field to a second terminal device.

Based on this possible design, a part of bits in the DAI field in the DCI may be used for indicating the BWP, and the bits used for indicating the BWP may be referred to as the BWP indication field. In this case, the DCI includes the DAI field and the BWP indication field.

A fixed quantity of bits may be selected from the DAI field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. The first indication field may be a part of bits in the DAI field.

In a possible design, with reference to the first aspect or the possible designs of the first aspect, the DCI includes a physical uplink control channel (PUCCH) resource indicator field. The PUCCH resource indicator field is used for indicating the BWP. Alternatively, the DCI does not include a physical uplink control channel (PUCCH) resource indicator field.

In a possible design, with reference to the first aspect or the possible designs of the first aspect, the first terminal device determines that a PUCCH resource is predefined.

Based on the foregoing two possible designs, all bits in the PUCCH resource indicator field in the DCI may be used for indicating the BWP, and the bits used for indicating the BWP may continue to be referred to as the PUCCH resource indicator field. In this case, the quantity of bits used for indicating the BWP may be fixed. To be specific, the quantity of bits used for indicating the BWP is all the bits in the foregoing PUCCH resource indicator field.

Alternatively, the bits used for indicating the BWP may be referred to as another field, for example, referred to as a BWP indication field. In this case, the DCI does not include the PUCCH resource indicator field. The quantity of bits used for indicating the BWP may be fixed. To be specific, the quantity of bits used for indicating the BWP is all the bits in the foregoing PUCCH resource indicator field.

When all the bits in the PUCCH resource indicator field in the DCI are used for indicating the BWP, it may be determined that the PUCCH resource is predefined. When the PUCCH resource indicated to the first terminal device is not affected, it is ensured that the quantity of bits in the DCI is aligned with the quantity of bits in the DCI for scheduling transmission of the common information, so that detection complexity is reduced, and power consumption of the first terminal device is further reduced. In this embodiment of this application, when a parameter is predefined, it may be considered that a value of the parameter is fixed or pre-negotiated, and is known by both the network device and the first terminal device in advance.

In addition, the DCI may further include a first indication field. The first indication field indicates the quantity of bits used for indicating the BWP, so that after receiving the DCI, the first terminal device can determine, based on the first indication field, the quantity of bits used for indicating the BWP. Alternatively, a quantity of bits in the first indication field may be fixed. Optionally, the first indication field may be a part of the bits used for indicating the BWP.

In a possible design, with reference to the first aspect or the possible designs of the first aspect, the DCI includes a physical uplink control channel (PUCCH) resource indicator field. The PUCCH resource indicator field includes M3 bits. M2 bits in the M3 bits are used for indicating the BWP. M3 is a quantity of bits used to send the PUCCH resource indicator field to a second terminal device.

In a possible design, with reference to the first aspect or the possible designs of the first aspect, M3-M2 bits in the PUCCH resource indicator field are used for indicating a PUCCH resource to the first terminal device. "–" indicates a minus sign.

Based on the foregoing two possible designs, a part of bits in the PUCCH resource indicator field in the DCI may be used for indicating the BWP, and the bits used for indicating the BWP may continue to be referred to as the PUCCH resource indicator field. In this case, the part of bits in the PUCCH resource indicator field are used for indicating the BWP, and the other part of bits are used for indicating the PUCCH resource to the first terminal device.

A fixed quantity of bits may be selected from the PUCCH resource indicator field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. Alternatively, a quantity of bits in the first indication field may be fixed. Optionally, the first indication field may be a part of bits in the PUCCH resource indicator field.

In a possible design, with reference to the first aspect or the possible designs of the first aspect, the DCI includes a physical uplink control channel (PUCCH) resource indicator field and a BWP indication field. The PUCCH resource indicator field includes M3-M2 bits. The BWP indication field includes M2 bits. The BWP indication field is used for indicating the BWP. The PUCCH resource indicator field is used for indicating a PUCCH resource to the first terminal device. M3 is a quantity of bits used to send the PUCCH resource indicator field to a second terminal device.

Based on this possible design, a part of bits in the PUCCH resource indicator field in the DCI may be used for indicating the BWP, and the bits used for indicating the BWP may be referred to as the BWP indication field. In this case, the DCI includes the PUCCH resource indicator field and the BWP indication field.

A fixed quantity of bits may be selected from the PUCCH resource indicator field to indicate the BWP. To be specific, the quantity of bits used for indicating the BWP is a fixed quantity of bits. In addition, the DCI may include a first indication field. The first indication field includes the quantity of bits used for indicating the BWP, so that after receiving the DCI, the first terminal device can determine, based on the first indication field, the quantity of bits used for indicating the BWP. Alternatively, a quantity of bits in the first indication field may be fixed. Optionally, the first indication field may be a part of bits in the PUCCH resource indicator field.

In a possible design, with reference to the first aspect or the possible designs of the first aspect, the DCI includes a physical downlink shared channel (PDSCH) to hybrid automatic repeat request (HARQ) feedback timing indicator field. The PDSCH-to-HARQ feedback timing indicator field is used for indicating the BWP. Alternatively, the DCI does not include a physical downlink shared channel (PDSCH) to hybrid automatic repeat request (HARQ) feedback timing indicator field.

In a possible design, with reference to the first aspect or the possible designs of the first aspect, a PDSCH-to-HARQ feedback timing relationship is predefined.

Based on the foregoing two possible designs, all bits in the PDSCH-to-HARQ feedback timing indicator field in the DCI may be used for indicating the BWP, and the bits used for indicating the BWP may continue to be referred to as the PDSCH-to-HARQ feedback timing indicator field. In this case, the quantity of bits used for indicating the BWP may be fixed. To be specific, the quantity of bits used for indicating the BWP is all the bits in the foregoing PDSCH-to-HARQ feedback timing indicator field.

Alternatively, the bits used for indicating the BWP may be referred to as another field, for example, referred to as a BWP indication field. In this case, the DCI does not include the PDSCH-to-HARQ feedback timing indicator field. The quantity of bits used for indicating the BWP may be fixed. To be specific, the quantity of bits used for indicating the BWP is all the bits in the foregoing PDSCH-to-HARQ feedback timing indicator field.

When all the bits in the PDSCH-to-HARQ feedback timing indicator field in the DCI are used for indicating the BWP, it may be determined that the first terminal device determines that the PDSCH-to-HARQ feedback timing relationship is predefined. When impact on the PDSCH-to-HARQ feedback timing relationship that is indicated to the first terminal device is reduced, it may be ensured that the quantity of bits in the DCI is aligned with the quantity of bits in the DCI for scheduling transmission of the common information, so that detection complexity is reduced, and power consumption of the first terminal device is further reduced.

In addition, the DCI may further include a first indication field. The first indication field includes the quantity of bits used for indicating the BWP, so that after receiving the DCI, the first terminal device can determine, based on the first indication field, the quantity of bits used for indicating the BWP. Alternatively, a quantity of bits in the first indication field may be fixed. Optionally, the first indication field may be a part of the bits used for indicating the BWP.

In a possible design, with reference to the first aspect or the possible designs of the first aspect, the DCI includes a physical downlink shared channel (PDSCH) to hybrid automatic repeat request (HARQ) feedback timing indicator field. The PDSCH-to-HARQ feedback timing indicator field includes M4 bits. M2 bits in the M4 bits are used for indicating the BWP. M4 is a quantity of bits used to send the PDSCH-to-HARQ feedback timing indicator field to a second terminal device.

In a possible design, with reference to the first aspect or the possible designs of the first aspect, M4-M2 bits in the PDSCH-to-HARQ feedback timing indicator field are used for indicating, to the first terminal device, a PDSCH-to-HARQ feedback timing relationship. "−" indicates a minus sign.

Based on the foregoing two possible designs, a part of bits in the PDSCH-to-HARQ feedback timing indicator field in the DCI may be used for indicating the BWP, and the bits used for indicating the BWP may continue to be referred to as the PDSCH-to-HARQ feedback timing indicator field. In this case, the part of bits in the PDSCH-to-HARQ feedback timing indicator field are used for indicating the BWP, and the other part of bits are used for indicating, to the first terminal device, the PDSCH-to-HARQ feedback timing relationship.

A fixed quantity of bits may be selected from the PDSCH-to-HARQ feedback timing indicator field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. Optionally, the first indication field may be a part of bits in the PDSCH-to-HARQ feedback timing indicator field.

In a possible design, with reference to the first aspect or the possible designs of the first aspect, the DCI includes a physical downlink shared channel (PDSCH) to hybrid automatic repeat request (HARQ) feedback timing indicator field and a BWP indication field. The PDSCH-to-HARQ feedback timing indicator field includes M4-M2 bits. The BWP indication field includes M2 bits. The BWP indication field is used for indicating the BWP. The PDSCH-to-HARQ feedback timing indicator field is used for indicating, to the first terminal device, a PDSCH-to-HARQ feedback timing relationship. M4 is a quantity of bits used to send the PDSCH-to-HARQ feedback timing indicator field to a second terminal device.

Based on this possible design, a part of bits in the PDSCH-to-HARQ feedback timing indicator field in the DCI may be used for indicating the BWP, and the bits used for indicating the BWP may be referred to as the BWP indication field. In this case, the DCI includes the PDSCH-to-HARQ feedback timing indicator field and the BWP indication field.

A fixed quantity of bits may be selected from the PDSCH-to-HARQ feedback timing indicator field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. Optionally, the first indication field may be a part of bits in the PDSCH-to-HARQ feedback timing indicator field.

In a possible design, with reference to the first aspect or the possible designs of the first aspect, the DCI includes a frequency domain resource assignment field. The frequency domain resource assignment field includes M5 bits. M2 bits in the M5 bits are used for indicating the BWP. M5 is a quantity of bits used to send the frequency domain resource assignment field to a second terminal device.

In a possible design, with reference to the first aspect or the possible designs of the first aspect. M5-M2 bits in the frequency domain resource assignment field are used for indicating an assigned frequency domain resource to the first terminal device. "−" indicates a minus sign.

Based on the foregoing two possible designs, a part of bits in the frequency domain resource assignment field in the DCI are used for indicating the BWP, and the bits used for indicating the BWP may continue to be referred to as the frequency domain resource assignment field. In this case, the part of bits in the frequency domain resource assignment field are used for indicating the BWP, and the other part of bits are used for indicating frequency domain resource assignment to the first terminal device.

A fixed quantity of bits may be selected from the frequency domain resource assignment field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. Optionally, the first indication field may be a part of bits in the frequency domain resource assignment field.

In a possible design, with reference to the first aspect or the possible designs of the first aspect, the DCI includes a frequency domain resource assignment field and a BWP indication field. The frequency domain resource assignment field includes M5-M2 bits. The BWP indication field includes M2 bits. The BWP indication field is used for indicating the BWP. The frequency domain resource assignment field is used for indicating an assigned frequency domain resource to the first terminal device. M5 is a quantity of bits used to send the frequency domain resource assignment field to a second terminal device.

Based on this possible design, a part of bits in the frequency domain resource assignment field in the DCI may be used for indicating the BWP, and the bits used for indicating the BWP may be referred to as the BWP indication field. In this case, the DCI includes the frequency domain resource assignment field and the BWP indication field.

A fixed quantity of bits may be selected from the frequency domain resource assignment field to indicate the BWP. To be specific, the quantity of bits used for indicating the BWP is a fixed quantity of bits. In addition, the DCI may include a first indication field. The first indication field indicates the quantity of bits used for indicating the BWP, so that after receiving the DCI, the first terminal device can determine, based on the first indication field, the quantity of bits used for indicating the BWP. Optionally, the first indication field may be a part of bits in the frequency domain resource assignment field.

In a possible design, with reference to the first aspect or the possible designs of the first aspect, the method further includes: determining, based on a maximum quantity of BWPs corresponding to the first terminal device, a quantity of bits used for indicating the BWP; determining, based on the maximum bandwidth of the first terminal device, a quantity of bits used for indicating the BWP; or determining, based on a bandwidth used to transmit the common information, a quantity of bits used for indicating the BWP.

Based on this possible design, the network device may determine, by using one of the foregoing methods, the quantity of bits used for indicating the BWP, so that a feasible solution is provided for the network device to determine the quantity of bits used for indicating the BWP.

In a possible design, with reference to the first aspect or the possible designs of the first aspect, that the DCI is used for indicating a BWP includes: a case 1: the DCI includes a downlink assignment index (DAI) field, used for indicating the BWP; a case 2: the DCI includes a physical uplink control channel (PUCCH) resource indicator field, used for indicating the BWP; a case 3: the DCI includes a physical downlink shared channel (PDSCH) to hybrid automatic repeat request (HARQ) feedback timing indicator field, used for indicating the BWP; a case 4: the DCI includes a frequency domain resource assignment field, used for indicating the BWP: or a case 5: the DCI includes a BWP indication field, used for indicating the BWP.

Based on this possible design, descriptions in the case 1 to the case 5 may be alternatively used. This is not limited.

In a possible design, with reference to the first aspect or the possible designs of the first aspect, the method further includes: sending second indication information to the first terminal device. The second indication information is used for indicating one of a plurality of candidate cases, to indicate the BWP to the first terminal device. The plurality of candidate cases include at least two of the case 1 to the case 5.

Based on this possible design, the network device may send the second indication information to the first terminal device, so that the first terminal device can determine, based on the second indication information, a type of the DCI that is used for indicating the BWP and that is in the case 1 to the case 5.

In a possible design, with reference to the first aspect or the possible designs of the first aspect, only a DCI format including the quantity of bits in the DCI is configured in user equipment UE-specific search space (USS) corresponding to the first terminal device.

Based on this possible design, the network device configures, in the USS of the first terminal device, only the DCI format including the quantity of bits in the DCI, so that the first terminal device performs detection on the received DCI based on only the DCI format. This reduces a quantity of times that the first terminal device performs blind detection on the DCI, and reduces detection complexity. Therefore, power consumption of the first terminal device is reduced, and an objective of power saving is achieved. This helps large-scale application of a service related to the first terminal device.

According to a second aspect, this application provides a communication apparatus. The communication apparatus may be a network device or another apparatus that can implement the method in the first aspect. The another apparatus may be a chip or a system-on-a-chip in the network device, or may be a module or a unit configured to implement the control information transmission method in embodiments of this application. The another apparatus may match the network device for use or be mounted in the network device. The communication apparatus may implement functions performed by the network device in the foregoing aspects or the possible designs, and the functions may be implemented by hardware, or may be implemented by hardware executing corresponding software. The hardware or the software includes one or more modules corresponding to the functions. In a design, the apparatus may include modules that are in one-to-one correspondence with the methods/operations/steps/actions described in the first aspect. The modules may be implemented by using a hardware circuit, software, or a combination of the hardware circuit and the software. In a design, the communication apparatus may include a sending unit.

The sending unit is configured to send, to a first terminal device, DCI used for indicating a BWP. A quantity of bits in the DC is a fixed quantity of bits. The DCI is used for scheduling a physical data channel. The BWP is used to transmit the physical data channel.

For a specific implementation of the communication apparatus, refer to behavior functions of the network device in the control information transmission method provided in any one of the first aspect or the possible designs of the first aspect. Details are not described herein again. Therefore, the provided communication apparatus can achieve same beneficial effects as any one of the first aspect or the possible designs of the first aspect.

According to a third aspect, a communication apparatus is provided. The communication apparatus may be a network device or another apparatus that can implement the method in the first aspect. The another apparatus may be a chip or a system-on-a-chip in the network device. The another apparatus may match the network device for use or be mounted in the network device. The communication apparatus may implement functions performed by the network device in the foregoing aspects or the possible designs, and the functions may be implemented by hardware. In a possible design, the communication apparatus may include a processor and a communication interface. The processor may be configured to support the communication apparatus in implementing the function in any one of the first aspect or the possible designs of the first aspect. For example, the processor is configured to send, to a first terminal device by using the communication interface, DCI used for indicating a BWP. A quantity of bits in the DCI is a fixed quantity of bits. The DCI is used for scheduling a physical data channel. The BWP is used to transmit the physical data channel. In another possible design, the communication apparatus may further include a memory, and the memory is configured to store computer instructions and/or data. When the processor executes the computer instructions stored in the memory, the communication apparatus is enabled to perform the control information transmission method in any one of the first aspect or the possible designs of the first aspect. In this embodiment of this application, the communication interface may be a transceiver, an interface circuit, a bus interface, a pin, or another apparatus that can implement a transceiver function.

According to a fourth aspect, a computer-readable storage medium is provided. The computer-readable storage medium stores instructions. When the instructions are run on a computer, the computer is enabled to perform the method in any one of the first aspect or the possible designs of the first aspect.

According to a fifth aspect, a computer program product including instructions is provided. The computer program product may include program instructions. When the computer program product runs on a computer, the computer is enabled to perform the method in any one of the first aspect or the possible designs of the first aspect.

According to a sixth aspect, a chip system is provided. The chip system includes a processor and a communication interface. The chip system may be used to implement functions performed by the network device in any one of the first aspect or the possible designs of the first aspect. For example, the processor is configured to send, to a first terminal device by using the communication interface, DCI used for indicating a BWP. A quantity of bits in the DCI is a fixed quantity of bits. The DCI is used for scheduling a physical data channel. The BWP is used to transmit the physical data channel. In a possible design, the chip system further includes a memory. The memory is configured to store program instructions and/or data. When the processor executes the program instructions stored in the memory, the chip system is enabled to perform the method in any one of the first aspect or the possible designs of the first aspect. The chip system may include a chip, or may include a chip and another discrete component. This is not limited.

According to a seventh aspect, an embodiment of this application provides a control information transmission method. The method may be performed by a first terminal device, a chip, or another apparatus. The method may include: receiving DCI from a network device. A quantity of bits in the DCI is a fixed quantity of bits. The DCI is used for scheduling a physical data channel. The DCI is used for indicating a BWP. The BWP is used to transmit the physical data channel. The method may further include: transmitting the physical data channel based on the DCI. For example, if the DCI is used for scheduling a downlink physical data channel, the method includes: receiving the downlink physical data channel from the network device based on the DCI. If the DCI is used for scheduling an uplink physical data channel, the method includes: sending the uplink physical data channel to the network device based on the DCI.

For detailed descriptions of the DCI and the like, refer to the first aspect. Details are not described herein again.

In a possible design, with reference to the seventh aspect, when the DCI includes a downlink assignment index (DAI) field used for indicating the BWP, or when the DCI does not include a downlink assignment index (DAI) field, the first terminal device may determine, in a static codebook manner, a hybrid automatic repeat request (HARQ) feedback to a downlink physical data channel transmitted in a transmission window of the downlink physical data channel.

In a possible design, with reference to the seventh aspect, when the DCI includes a physical uplink control channel (PUCCH) resource indicator field used for indicating the BWP, or when the DCI does not include a physical uplink control channel (PUCCH) resource indicator field, the first terminal device may determine that a PUCCH resource is predefined.

In a possible design, with reference to the seventh aspect, when the DCI includes a physical downlink shared channel (PDSCH) to hybrid automatic repeat request (HARQ) feedback timing indicator field used for indicating the BWP, or when the DCI does not include a physical downlink shared channel (PDSCH) to hybrid automatic repeat request (HARQ) feedback timing indicator field, the first terminal device may determine that a PDSCH-to-HARQ feedback timing relationship is predefined.

In a possible design, with reference to the seventh aspect or the possible designs of the seventh aspect, the first terminal device receives, from the network device, the DCI that includes the fixed quantity of bits; and interprets the received DCI based on a DCI format of the DCI.

According to an eighth aspect, this application provides a communication apparatus. The communication apparatus may be a first terminal device or another apparatus that can implement the method in the second aspect. The another apparatus may be a chip or a system-on-a-chip in the first terminal device, or may be a module or a unit that is in the first terminal device and that is configured to implement the control information transmission method in embodiments of this application. The another apparatus may match the first terminal device for use or be mounted in the first terminal device. The communication apparatus may implement functions performed by the first terminal device in the foregoing aspects or the possible designs, and the functions may be implemented by hardware, or may be implemented by hardware executing corresponding software. The hardware or the software includes one or more modules corresponding to the functions. In a design, the apparatus may include modules that are in one-to-one correspondence with the methods/operations/steps/actions described in the seventh aspect. The modules may be implemented by using a hardware circuit, software, or a combination of the hardware circuit and the software. In a design, the communication apparatus may include a receiving unit and a processing unit.

The receiving unit is configured to receive DCI from a network device. A quantity of bits in the DCI is a fixed quantity of bits. The DCI is used for scheduling a physical data channel. The DCI is used for indicating a BWP. The BWP is used to transmit the physical data channel.

The processing unit is configured to schedule the physical data channel based on the DCI For a specific implementation of the communication apparatus, refer to behavior functions of the first terminal device in the control information transmission method provided in any one of the seventh aspect or the possible designs of the seventh aspect. Details are not described herein again. Therefore, the provided communication apparatus can achieve same beneficial effects as any one of the seventh aspect or the possible designs of the seventh aspect.

According to a ninth aspect, a communication apparatus is provided. The communication apparatus may be a first terminal device or another apparatus that can implement the method in the second aspect. The another apparatus may be a chip or a system-on-a-chip in the first terminal device. The another apparatus may match the first terminal device for use or be mounted in the first terminal device. The communication apparatus may implement functions performed by the first terminal device in the foregoing aspects or the possible designs, and the functions may be implemented by hardware. In a possible design, the communication apparatus may include a processor and a communication interface. The processor may be configured to support the communication apparatus in implementing the function in any one of the seventh aspect or the possible designs of the seventh aspect. For example, the processor is configured to receive, through the communication interface, DCI from a network device, where a quantity of bits in the DCI is a fixed quantity of bits, the DCI is used for scheduling a physical data channel, the DCI is used for indicating a BWP, and the BWP is used to transmit the physical data channel; and schedule the physical data channel based on the DCI. In another possible design, the communication apparatus may further include a memory, and the memory is configured to store computer instructions and/or data. When the processor executes the computer instructions stored in the memory, the communication apparatus is enabled to perform the method in any one of the seventh aspect or the possible designs of the seventh aspect.

According to a tenth aspect, a computer-readable storage medium is provided. The computer-readable storage medium stores instructions. When the instructions are run on a computer, the computer is enabled to perform the method in any one of the seventh aspect or the possible designs of the seventh aspect.

According to an eleventh aspect, a computer program product including instructions is provided. The computer program product may include program instructions. When the computer program product runs on a computer, the computer is enabled to perform the method in any one of the seventh aspect or the possible designs of the seventh aspect.

According to a twelfth aspect, a chip system is provided. The chip system includes a processor and a communication interface. The chip system may be used to implement functions performed by the first terminal device in any one of the seventh aspect or the possible designs of the seventh aspect. For example, the processor is configured to receive, through the communication interface, DCI from a network device, where a quantity of bits in the DCI is a fixed quantity of bits, the DCI is used for scheduling a physical data channel, the DCI is used for indicating a BWP, and the BWP is used to transmit the physical data channel; and schedule the physical data channel based on the DCI. In a possible design, the chip system further includes a memory. The memory is configured to store program instructions and/or data. When the chip system runs, the processor executes the program instructions stored in the memory, to enable the chip system to perform the method in any one of the seventh aspect or the possible designs of the seventh aspect. The chip system may include a chip, or may include a chip and another discrete component. This is not limited.

According to a thirteenth aspect, an embodiment of this application further provides a communication system. The communication system includes the communication apparatus in either of the second aspect and the third aspect and the communication apparatus in either of the eighth aspect and the ninth aspect.

DESCRIPTION OF EMBODIMENTS

Figure 1A:
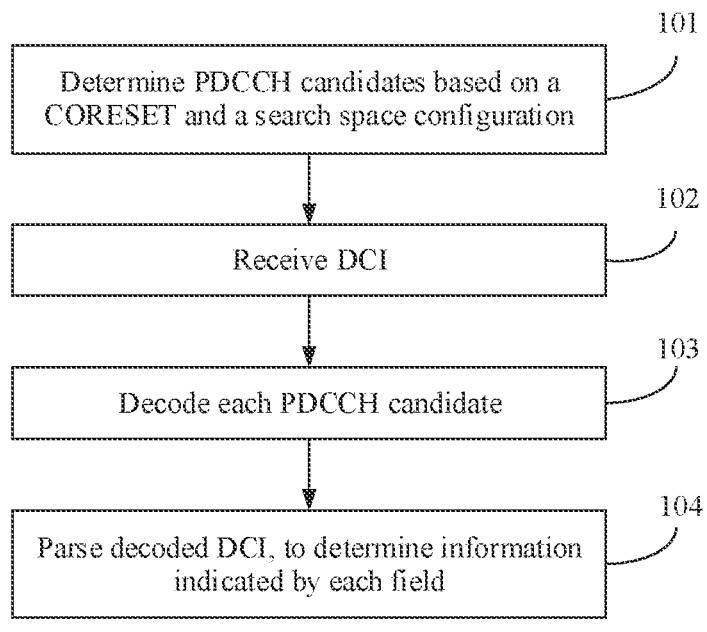
FIG. 1a is a flowchart of performing blind detection on DCI by a terminal device according to an embodiment of this application.

Before embodiments of this application are described, technical terms used in embodiments of this application are described.

BWP: A bandwidth part (BWP) is a segment of consecutive frequency domain resources (which may alternatively be described as frequency resources, frequency resources in frequency domain, or the like) configured by a network device for a terminal device, so that flexible transmission bandwidth configuration between the network device and the terminal device can be achieved. By using the BWP, the terminal device may not need to know an actual transmission bandwidth (for example, a carrier bandwidth) of the network device, but only needs to support a BWP bandwidth configured for the terminal device.

Specifically, each BWP configured by the network device for the terminal device includes consecutive resource blocks (RBs) in frequency domain, and one of the RBs includes 12 subcarriers. On one carrier, the network device may configure the terminal device with a maximum of four BWPs. A transmission bandwidth included in each BWP is less than or equal to a bandwidth capability of the terminal device. Generally, data transmission between the network device and the terminal device may be dynamically adjusted within a frequency domain resource range corresponding to the configured BWP. In addition, a frequency domain resource corresponding to data transmission performed by the terminal device each time may be within only a frequency domain resource range corresponding to one BWP, and the BWP is an activated BWP. It should be noted that, in this application, the transmission bandwidth of the BWP may alternatively greater than the bandwidth capability of the terminal device. A difference between the activated BWP and a BWP that is configured but not activated may include at least one of the following distinguishing features.

Difference (1): On the BWP that is configured but not activated, the terminal device does not expect to receive a physical downlink data channel and/or a physical downlink data signal.

The physical downlink data channel may be a physical downlink shared channel (PDSCH) or a physical downlink control channel (PDCCH). The physical downlink data signal may be a channel state information-reference signal (CSI-RS). If the CSI-RS is used for radio resource management (RRM), the terminal device may perform, by using the CSI-RS, RRM measurement on the BWP that is configured but not activated.

Difference (2): On the BP that is configured but not activated, the terminal device does not expect to send a physical uplink data channel and/or a physical uplink data signal.

The physical uplink data channel may be a physical uplink shared channel (PUSCH) or a physical uplink control channel (PUCCH). The physical uplink data signal may be a sounding reference signal (SRS).

In addition, in a plurality of BWPs configured for a terminal device, frequency domain resources included in different BWPs may overlap or may not overlap. BWPs configured for different terminal devices may be the same or may be different.

The BWP is configured, to help the terminal device implement data transmission in a greater bandwidth. As described above, the terminal device is configured with a maximum of four BWPs on one carrier. Therefore, BWP reconfiguration may be implemented by using, for example, radio resource control (RRC) signaling, so that the terminal device performs data transmission with the network device in different BWPs.

Further, dynamic BWP switching may be further implemented by using downlink control information (DCI), to dynamically implement transmission between the terminal device and the network device in different data transmission bandwidths, so that the terminal device can obtain a frequency-domain selective scheduling gain. This ensures data transmission efficiency.

DCI: The DCI may include BWP switching indication information. A network device may flexibly switch, based on a data transmission requirement, a BWP used for data transmission, include the BWP switching indication information in a control field of the DCI, and send the DCI to a terminal device. The terminal device detects the received DCI, determines a switched BWP, and performs data transmission with the network device by using the switched BWP. This reduces costs of the terminal device and improves data transmission efficiency.

In a possible implementation, the network device may send, to the terminal device in advance, radio resource control (RRC) signaling that is configured for the terminal device and that includes a quantity of BWPs and specific information about each BWP. During data transmission, the network device may flexibly switch, based on the data transmission requirement, the BWP used for data transmission, include the BWP switching indication information in the control field of the DCI, and send the DCI to the terminal device. The terminal device detects the received DCI, determines a switched BWP, and performs data transmission with the network device by using the switched BWP. This reduces costs of the terminal device and improves data transmission efficiency.

A quantity of bits in the control field that includes the indication information used for indicating the switched BWP may be configured based on a quantity of BWPs in the RRC signaling. For example, when the RRC signaling includes four BWPs, the quantity of bits in the control field in the DCI may be two bits. When detecting the DCI, the terminal device may determine, based on the quantity of BWPs in the RRC signaling, the quantity of bits in the control field, determine a specific value of the control field in the DCI based on the quantity of bits in the control field, determine, based on the specific value, the switching BWP indicated by the DCI, and transmit data by using the switched BWP.

In addition, because parameter information of the RRC signaling is carried by using a PDSCH, and PDSCH transmission is scheduled by using DCI carried on a PDCCH, to simplify implementation of the terminal device and avoid impact of the RRC signaling on DCI detection, the terminal device further needs to detect DCI that does not include BWP switching. In addition, after the network device sends RRC reconfiguration information and before the network device determines that the terminal device receives the RRC reconfiguration information, when the network device performs data transmission with the terminal device by using the RRC reconfiguration information, data transmission reliability cannot be ensured. The terminal device may detect the DCI that does not include BWP switching, to implement reliable and effective data transmission with the network device.

Therefore, the terminal device may obtain, by detecting DCI of different formats, DCI that indicates BWP switching, and implement BWP switching based on an indication of the obtained DCI. For example, FIG. 1a shows a process in which a terminal device performs blind detection on DCI. As shown in FIG. 1a, the process includes the following steps.

Step 101: Determine PDCCH candidates based on a CORESET and a search space configuration.

The terminal device may determine, based on the CORESET, information such as a frequency band occupied by the PDCCH in frequency domain and a quantity of OFDM symbols occupied by the PDCCH in time domain, and determine, based on the search space configuration, information such as a number of a start orthogonal frequency division multiplexing (OFDM) symbol of the PDCCH and a monitoring periodicity of the PDCCH. That is, the terminal device determines a candidate time-frequency position of the PDCCH based on the CORESET and the search space configuration.

Step 102: Receive the DCI.

Step 103: Decode each PDCCH candidate.

Specifically, the terminal device may perform decoding at the candidate time-frequency position of the PDCCH by using a decoder. An output length of the decoder is a length of the DCI.

If a cyclic redundancy check (CRC) of a decoded information bit is the same as a CRC carried by the PDCCH, it is considered that the decoding is successful. The CRC may include a radio network temporary identifier (RNTI).

Before sending the DCI to the terminal device, a network device may scramble the DCI by using a system information radio network temporary identifier (SI-RNTI), a paging radio network temporary identifier (P-RNTI), or the like. Therefore, the terminal device may further correspondingly descramble the DCI.

Step 104: Parse decoded DCI, to determine information indicated by each field.

Specifically, the terminal device may determine a BWP based on a field that is in the DCI and that is used for indicating BWP switching, and implement switching.

In the foregoing blind detection manner, the terminal device needs to detect both DCI that includes BWP switching and DCI that does not include BWP switching. Because a quantity of bits in the DCI that includes BWP switching is different from a quantity of bits in the DCI that does not include BWP switching, the terminal device needs to detect at least DCI of two quantities of bits to implement BWP switching and data transmission. Generally, DCI with different quantities of bits corresponds to different DCI formats. Because the terminal device does not determine a type of the DCI sent by the network device, the terminal device needs to detect all possible DCI formats. A larger quantity of DCI formats detected by the terminal device (or a larger quantity of DCI that has different quantities of bits in the DCI and that is detected by the terminal device) indicates higher power consumption. Therefore, in an NR system, although the terminal device can implement BWP switching, because the quantity of detected DCI formats is large, detection complexity is high, and power consumption of the terminal device is high. This is not helpful in power saving of the terminal device and is not helpful in large-scale application of the foregoing service.

To resolve this problem, an embodiment of this application provides a control information transmission method. The method includes: A network device sends, to a first terminal device, DCI with a fixed quantity of bits. The DCI is used for scheduling a physical data channel, and is further used for indicating a BWP used to transmit the physical data channel. In this embodiment of this application, the quantity of bits in the DCI that is sent by the network device to the first terminal device and that is used for indicating the BWP is fixed. When performing blind detection on the DCI sent by the network device, the first terminal device may perform blind detection by using a detection apparatus with the fixed quantity of bits. DCI that is successfully detected is the DCI that indicates the BWP. In this way, a quantity of times that the first terminal device performs blind detection on the DCI is reduced, and detection complexity is reduced. Therefore, power consumption of the first terminal device is reduced, and an objective of power saving is achieved. This helps large-scale application of a service related to the first terminal device.

It should be noted that the terminal device described in this application may be a legacy terminal device (a high-capability terminal) or a reduced capability (REDCAP) terminal. The REDCAP terminal may also be referred to as a light terminal. This is not limited. The legacy terminal may be an enhanced mobile broadband (eMBB) terminal, a machine type communication (MTC) terminal, or the like. In comparison with the legacy terminal device, the REDCAP terminal device is a terminal device with a lower configuration. A feature comparison between the REDCAP terminal device and the legacy terminal device satisfies at least one of a first item to a ninth item below. "At least one (item) of" may be one or more items, for example, two items, three items, or more items. This is not limited in this embodiment of this application.

First item: A maximum bandwidth supported by the high-capability terminal is greater than a maximum bandwidth supported by the REDCAP terminal. For example, the maximum bandwidth supported by the high-capability terminal is 100 MHz (megahertz) or 200 MHz, and the maximum bandwidth supported by the REDCAP terminal is 20 MHz, 10 MHz, or 5 MHz.

Second item: A quantity of antennas of the high-capability terminal is greater than a quantity of antennas of the REDCAP terminal. The quantity of antennas may be a quantity of antennas disposed for the terminal, or a maximum quantity of antennas used for sending and/or receiving. For example, the high-capability terminal supports a maximum of four receive antennas and two transmit antennas, and the REDCAP terminal supports a maximum of two receive antennas and one transmit antenna. Alternatively, even if the quantity of antennas of the high-capability terminal is equal to the quantity of antennas of the NR REDCAP terminal, the high-capability terminal and the NR REDCAP terminal are different in a capability of antenna selective transmission. For example, both the high-capability terminal and a low-capability terminal support two transmit antennas. However, the high-capability terminal supports antenna selective transmission, but the low-capability terminal does not support the antenna selective transmission. Using single-antenna port data transmission as an example, the high-capability terminal may switch single-antenna port data transmission on two transmit antennas, and a space diversity gain may be obtained for the data transmission. However, single-antenna port data transmission of the low-capability terminal can only be simultaneously performed on two transmit antennas, which is equivalent to transmission performance of one transmit antenna.

Third item: A maximum transmit power supported by the high-capability terminal is greater than a maximum transmit power supported by the REDCAP terminal. For example, the maximum transmit power supported by the high-capability terminal is 23 decibel-milliwatts (dBm) or 26 dBm, and the maximum transmit power supported by the REDCAP terminal is a value from 4 dBm to 20 dBm.

Fourth item: The high-capability terminal supports carrier aggregation (CA), and the REDCAP terminal does not support carrier aggregation.

Fifth item: When both the high-capability terminal and the REDCAP terminal support carrier aggregation, a maximum quantity of carriers supported by the high-capability terminal is greater than a maximum quantity of carriers supported by the REDCAP terminal. For example, the high-capability terminal supports aggregation of a maximum of 32 carriers or five carriers, and the REDCAP terminal supports aggregation of a maximum of two carriers.

Sixth item: The high-capability terminal and the RED-CAP terminal are introduced in different protocol versions. For example, in an NR protocol, the high-capability terminal is a terminal introduced in Release (R) 15 of the protocol, and the REDCAP terminal is a terminal introduced in R17 of the protocol.

Seventh item: The high-capability terminal and the RED-CAP terminal have different duplex capabilities. The high-capability terminal has a stronger duplex capability. For example, the high-capability terminal supports full-duplex frequency division duplex (FDD). To be specific, the high-capability terminal supports simultaneous receiving and sending when supporting FDD. The REDCAP terminal supports half-duplex FDD. To be specific, the REDCAP terminal does not support simultaneous receiving and sending when supporting FDD.

Eighth item: A data processing capability of the high-capability terminal is stronger than a data processing capability of the REDCAP terminal. The high-capability terminal may process more data within same time. Alternatively, processing time of the high-capability terminal is shorter when the high-capability terminal processes same data. For example, a time point at which a terminal receives downlink data from a network device is recorded as T1. After the terminal processes the downlink data, a time point at which the terminal sends, to the network device, a feedback to the downlink data is recorded as T2. A delay (time difference) between T2 and T1 of the high-capability terminal is less than a delay of T2 and T1 of the REDCAP terminal. The feedback to the downlink data may be an ACK feedback or a NACK feedback.

Ninth item: A peak rate of data transmission of the high-capability terminal is greater than a peak rate of data transmission of the REDCAP terminal. The data transmission includes uplink data transmission (to be specific, a terminal sends data to a network device) and/or downlink data transmission (to be specific, the terminal receives data from the network device).

Optionally, for ease of differentiation, in this embodiment of this application, the high-capability terminal may also be referred to as a non-REDCAP terminal.

The REDCAP terminal may be applied to various scenarios such as the internet of things, mMTC, or V2X. In a possible design, in comparison with the high-capability terminal, the REDCAP terminal is required to have lower power consumption. The lower the power consumption of the REDCAP terminal is, the longer a battery life of the REDCAP terminal is, and the better user experience is. In addition, deployment environments (for example, an underground pipeline or a suburban area) of some REDCAP terminals are special, and it is inconvenient to adjust a power supply system of the REDCAP terminal in the environments. In this case, the power consumption of the REDCAP terminal is reduced, so that subsequent maintenance of this type of terminal can be simplified, and user experience is improved. Therefore, how to reduce the power consumption of the REDCAP terminal is a problem worth studying.

Optionally, the method provided in this embodiment of this application may alternatively be applied to another type of terminal, for example, the high-capability terminal (for example, an eMBB terminal or a URLLC terminal that supports a URLLC service), to reduce power consumption of the terminal and further improve user experience. To simplify description, in this embodiment of this application, the REDCAP terminal may be used as an example for description.

The following describes implementations of embodiments of this application in detail with reference to accompanying drawings in this specification.

The control information transmission method provided in embodiments of this application may be applied to any wireless communication system. The wireless communication system may be a 3rd generation partnership project (3GPP) wireless communication system, for example, a long term evolution (LTE) system, or may be a 5th generation (5G) wireless communication system, a new radio (NR) system, an NR V2X system, or another next-generation communication system, or may be a non-3GPP communication system. This is not limited.

The control information transmission method provided in embodiments of this application may be applied to various communication scenarios, for example, may be applied to one or more of the following communication scenarios: enhanced mobile broadband (eMBB), ultra-reliable low-latency communication (URLLC), machine type communication (MTC), massive machine-type communications (mMTC), device-to-device (D2D), vehicle-to-everything (V2X), vehicle-to-vehicle (V2V), and the internet of things (IoT). The following uses FIG. 1b as an example to describe the control information transmission method provided in embodiments of this application.

Figure 1B:
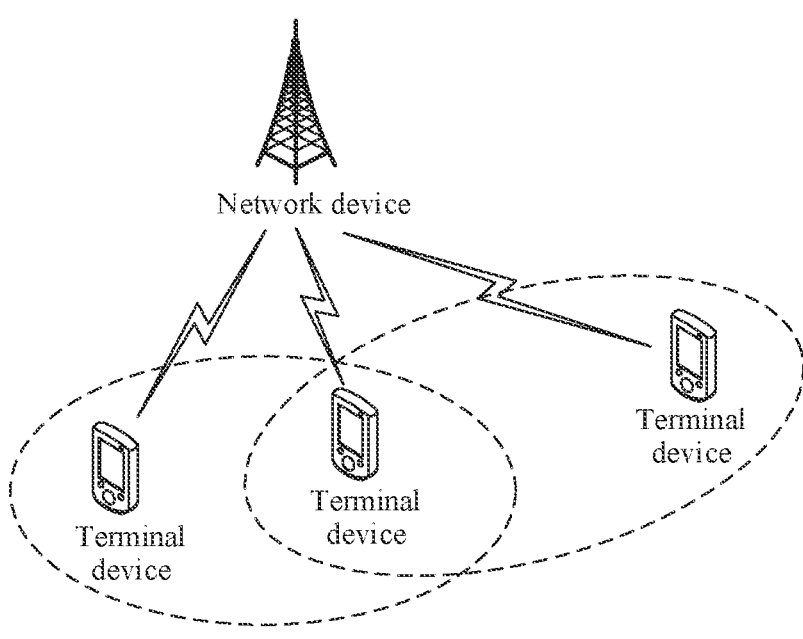
FIG. 1b is a schematic composition diagram of a communication system according to an embodiment of this application.

FIG. 1b is a schematic diagram of a communication system according to an embodiment of this application. As shown in FIG. 1b, the communication system may include at least one communication device, and the communication devices may perform wireless communication by using an air interface resource. The communication device may include a network device and a terminal device, and the network device may also be referred to as a network-side device. The air interface resource may include at least one of a time domain resource, a frequency domain resource, a code resource, and a spatial resource. In embodiments of this application, "at least one" may also be described as "one or more", and "a plurality of" may be "two, three, four, or more". This is not limited in this application.

The terminal device in embodiments of this application may also be referred to as a terminal, and may be a device having a wireless transceiver function. The terminal device may be deployed on land, including an indoor device, an outdoor device, a handheld device, or a vehicle-mounted device; may be deployed on the surface of water (such as in a steamship); or may be deployed in the air (such as on an airplane, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR)

terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of the terminal may be a terminal, or may be an apparatus, for example, a chip system, that can support the terminal in implementing this function. The apparatus may be mounted in the terminal. In embodiments of this application, the chip system may include a chip, or may include a chip and another discrete component. In the technical solutions provided in embodiments of this application, the technical solutions provided in embodiments of this application are described by using an example in which the apparatus for implementing the terminal function is a terminal and the terminal is UE.

The network device in embodiments of this application includes a base station (BS), and may be a device that is deployed in a radio access network and that can perform wireless communication with the terminal. The base station may be in a plurality of forms, such as a macro base station, a micro base station, a relay station, and an access point. For example, the base station in embodiments of this application may be a base station in 5G or a base station in LTE. The base station in 5G may also be referred to as a transmission reception point (TRP) or a gNB. In embodiments of this application, an apparatus configured to implement a function of the network device may be a network device, or may be an apparatus, for example, a chip system, that can support the network device in implementing this function. The apparatus may be mounted in the network device. In the technical solutions provided in embodiments of this application, the technical solutions provided in embodiments of this application are described by using an example in which the apparatus for implementing the network device function is a network device and the network device is a base station.

Figures 2, 3, 4:
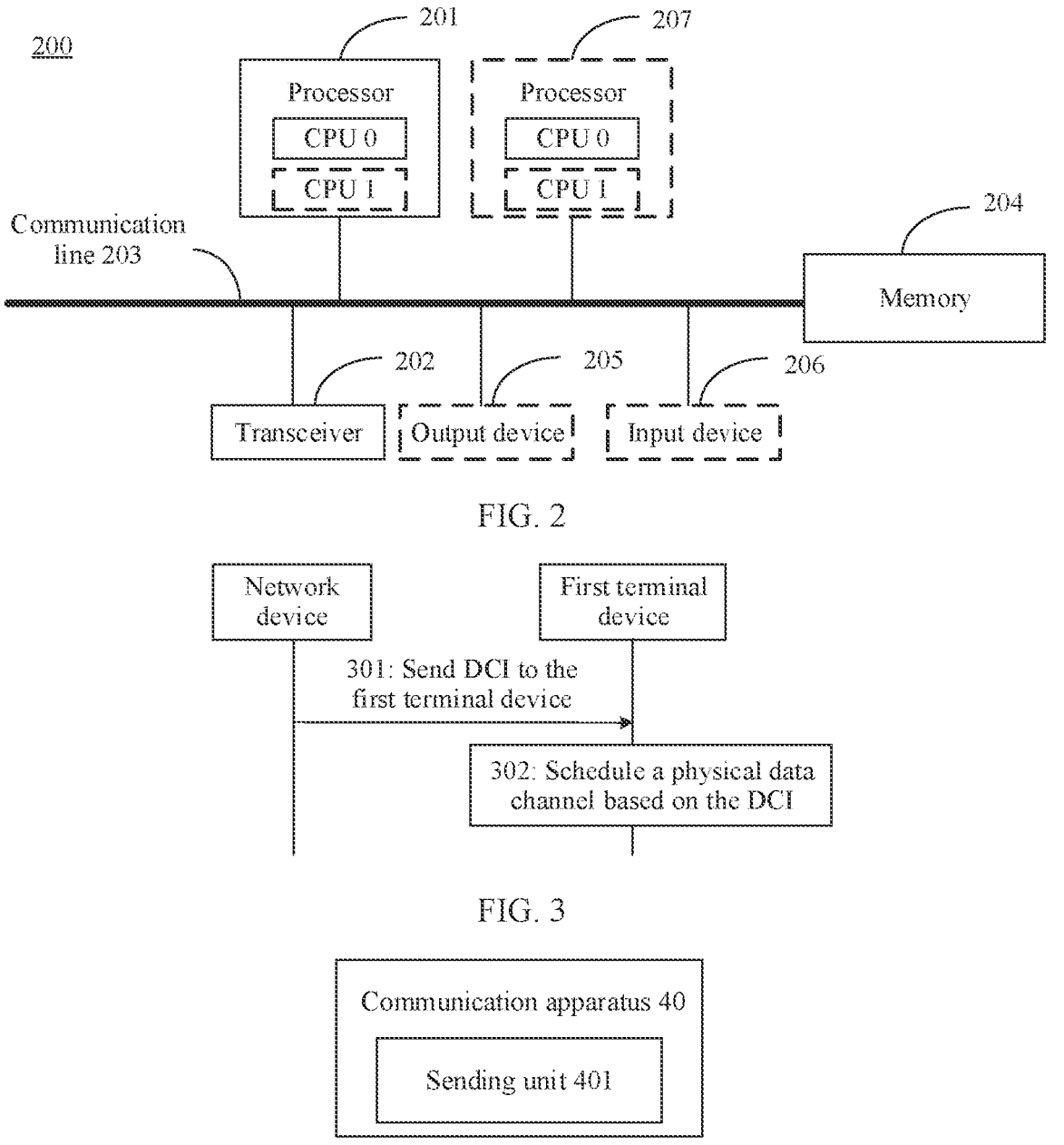
FIG. 2 is a schematic diagram of a communication apparatus according to an embodiment of this application.
FIG. 3 is a flowchart of a control information transmission method according to an embodiment of this application.
FIG. 4 is a schematic composition diagram of a communication apparatus 40 according to an embodiment of this application.

During specific implementation, as shown in FIG. 1b, for example, both the network device and the terminal device may use a composition structure shown in FIG. 2 or include components shown in FIG. 2. FIG. 2 is a schematic composition diagram of a communication apparatus 200 according to an embodiment of this application. The communication apparatus 200 may be a network device, or a chip or a system-on-a-chip in the network device; or may be a terminal device, or a chip or a system-on-a-chip in the terminal device. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be an Ethernet, a radio access network (RAN), a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (ROM) or another type of static storage device that can store static information and/or instructions; may be a random access memory (RAM) or another type of dynamic storage device that can store information and/or instructions; or may be an electrically erasable programmable read-only memory (EE-PROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the control information transmission method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the communication apparatus 200 may be a desktop computer, a portable computer, a network server, a mobile phone, a tablet computer, a wireless terminal, an embedded device, a chip system, or a device having a structure similar to that in FIG. 2. In addition, the composition structure shown in FIG. 2 does not constitute a limitation on the communication apparatus. In addition to the components shown in FIG. 2, the communication apparatus may include more or fewer components than those shown in the figure, combine some components, or have different component arrangements.

In embodiments of this application, the chip system may include a chip, or may include a chip and another discrete component.

The technical solutions provided in embodiments of this application may be applied to wireless communication between a network device and a terminal device. In embodiments of this application, the term "wireless communication" may be referred to as "communication" for short, and the term "communication" may also be described as "data transmission", "information transmission", or "transmission". The technical solutions may be used for wireless communication between a scheduling entity and a subordinate entity. A person skilled in the art may use the technical solutions provided in embodiments of this application to perform wireless communication between another scheduling entity and the subordinate entity.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

With reference to the communication system shown in FIG. 1b, the following describes a control information transmission method provided in an embodiment of this application. A network device in the following embodiment is any network device in the communication system shown in FIG. 1b, and a first terminal device is any terminal device in the communication system shown in FIG. 1b. Both the network device and the first terminal device described in the following embodiment may include the components shown in FIG. 2.

FIG. 3 is a flowchart of a control information transmission method according to an embodiment of this application. As shown in FIG. 3, the method may include the following steps.

Step 301: A network device sends DCI to a first terminal device.

A quantity of bits in the DCI may be a fixed quantity of bits. The DCI may be used for scheduling a physical data channel. The DCI may further be used for indicating a BWP. For example, the fixed quantity of bits in the DCI may carry a bit used for indicating the BWP. The BWP is used to transmit the physical data channel. In this application, a quantity of bits used for indicating the BWP may be determined based on a maximum quantity of BWPs that are preconfigured for the first terminal device. For example, if the maximum value of the quantity of configured BWPs is M, the quantity of bits that are used for indicating the BWP and that are in the DCI may be ceil(log $2M$), where ceil(X) indicates an integer that is greater than X and closest to X. The BWP indicated by the DCI may be any one of the plurality of BWPs preconfigured for the first terminal device. For example, a terminal 1 is preconfigured with four BWPs, namely, a BWP 0 to a BWP 3. A quantity of bits used for indicating the BWP may be two. When the terminal 1 needs to activate the BWP 0 for the first time, when a physical data channel is transmitted on the BWP 0, the DCI may carry 00, to indicate that the BWP is the BWP 0. Alternatively, when the BWP 1 needs to be activated, and the terminal 1 is indicated to switch from the BWP 0 to the BWP 1, the DCI may carry 01, to indicate that the BWP is the BWP 1.

In this application, the physical data channel may be a physical downlink control channel (PDCCH), an enhanced PDCCH (EPDCCH), a machine type communication (MTC) PDCCH (MPDCCH), a narrowband PDCCH (NPDCCH), another channel that is newly defined in a future communication protocol and whose function is the same as or similar to that of a downlink control channel, or the like. This is not limited.

For example, in a process of data transmission with the first terminal device, the network device may flexibly switch, based on a data transmission requirement, the BWP used for data transmission, generate the DCI that is used for indicating the BWP and that has the fixed quantity of bits, and send the DCI to the first terminal device, so that the first terminal device completes BWP switching based on the DCI with the fixed quantity of bits.

In this application, a length of the DCI used for indicating the BWP may be the same as a length of DCI specified in a communication protocol. For example, a quantity of bits in the DCI specified in the protocol may be determined as the quantity of bits in the DCI used for indicating the BWP. Specifically, for a manner of determining the fixed quantity of bits in the DCI, refer to Manner 1 to Manner 4 below. In addition to the bit used for indicating the BWP, the DCI may further include another bit shown in Table 1.

In a possible design, in this embodiment of this application, in a process in which the network device communicates with the first terminal device, the fixed quantity of bits in the DCI used for indicating the BWP remains unchanged.

For example, in the process in which the network device communicates with the first terminal device, the quantity of bits in the DCI used for indicating the BWP may be always B1, so that the first terminal device may determine, by detecting DCI whose quantity of bits is B1, the BWP indicate by the network device.

In another possible design, in this embodiment of this application, in the process in which the network device communicates with the first terminal device, the fixed quantity of bits in the DCI used for indicating the BWP remains unchanged in a time period, and the quantity of bits in the DCI used for indicating the BWP may be different in different time periods.

For example, in the process in which the network device communicates with the first terminal device, the quantity of bits in the DCI used for indicating the BWP may be B1 in a time period T1, and B2 in a time period T2.

Specifically, the network device may receive, before the time period T1 or at an initial moment of the time period T1, information indicating that "the quantity of bits in the DCI used for indicating the BWP is B1". The network device may further include, in content carried on the physical data channel scheduled by using the DCI, information indicating that "the quantity of bits in the DCI used for indicating the BWP is B1 in the time period T1", and send the content to the first terminal device, so that the first terminal device determines, based on the information, that the quantity of bits in the DCI used for indicating the BWP is B1 in the time period T1.

Alternatively, the network device may include, in the content carried on the physical data channel scheduled by using the DCI, information indicating that "the quantity of bits in the DCI used for indicating the BWP is B2 in the time period T2", and send the content to the first terminal device, so that the first terminal device determines, based on the indication information, that the quantity of bits in the DCI used for indicating the BWP is B2 in the time period T2.

Step 302: The first terminal device receives the DCI, and schedules the physical data channel based on the DCI.

Optionally, the first terminal device detects the DCI in USS (UE-specific search space, USS). Only a DCI format with the quantity of bits in the DCI is configured in the USS. In other words, the first terminal device detects, in the USS, only a DCI format with a size of the DCI. In other words, in the USS configured by the network device for the first terminal device, the network device configures, for the terminal device, only a DCI format with the quantity of bits in the DCI.

It should be noted that the USS herein is one or more pieces of USS (including all configured USS) in the at least one piece of USS configured by the network device for the terminal device, and there may be one or more DCI formats with the quantity of bits in the DCI. Different DCI formats may be distinguished between by using different identifiers, for example, may be distinguished between by using different RNTIs. One of the DCI formats is a DCI format including the DCI indicated in this embodiment of this application.

Because only the DCI format with the quantity of bits in the DCI indicated in this embodiment of this application is configured in the USS, the first terminal device may detect, in the USS, only a DCI format with one size of the DCI. In comparison with a conventional technology in which the first terminal device detects, in the USS, DCI formats with at least two sizes of the DCI, when the technical solution proposed in this embodiment of this application is used, a quantity of times that the first terminal device performs blind detection on the PDCCH can be reduced. In addition, the DCI proposed in this embodiment of this application may be used for indicating the BWP, so that BWP switching can be implemented, and a frequency-domain scheduling gain and reliability of data transmission can be ensured.

Optionally, the first terminal device detects, in USS and common search space (CSS), only a DCI format with the quantity of bits in the DCI. In other words, in the USS and the CSS that are configured by the network device for the first terminal device, the network device configures, for the first terminal device, only a DCI format with the quantity of bits in the DCI. The USS is one or more pieces of USS (including all configured USS) in the at least one piece of USS configured by the network device for the first terminal device, and the CSS is one or more pieces of CSS (including all configured CSS) in the at least one piece of CSS configured by the network device for the first terminal device. There may be one or more DCI formats with the quantity of bits in the DCI. Different DCI formats may be distinguished between by using different identifiers, for example, may be distinguished between by using different RNTIs. One of the DCI formats is a DCI format including the DCI indicated in this embodiment of this application. For the first terminal device, when only the DCI format with the quantity of bits in the DCI is configured in all the configured USS and all the configured CSS, the first terminal device needs to detect only a DCI format with one size of the DCI at most. In comparison with a conventional technology in which the terminal device detects, in the CSS and the USS, DCI formats with four sizes of the DCI at most, when the technical solution proposed in this embodiment of this application is used, the quantity of times that the first terminal device performs blind detection on the PDCCH can be reduced, so that power consumption is reduced.

In the method shown in FIG. 3, the network device or the first terminal device may determine the quantity of bits in the DCI in any one of Manner 1 to Manner 4 below.

Manner 1: The quantity of bits in the DCI is predefined.

Specifically, the quantity of bits in the DCI used for indicating the BWP may be determined in a manner predefined in a standard. Alternatively, the quantity of bits in the DCI used for indicating the BWP may be the same as a quantity of bits in DCI specified in a protocol.

The DCI specified in the protocol may be a DCI format 1-0, a DCI format 1-1, a DCI format 1-2, a DCI format 0-1, a DCI format 0-0, or a DCI format 0-2.

For example, assuming that it is pre-specified in a communication protocol that the quantity of bits in the DCI used for indicating the BWP is B1, when the network device sends, to the first terminal device, the DCI used for indicating the BWP, the quantity of bits in the DCI is set to B1.

Alternatively, assuming that the quantity of bits in the DCI used for indicating the BWP is the same as a quantity of bits in the DCI format 1-0, if the quantity of bits in the DCI format 1-0 is B2, it is determined that the quantity of bits in the DCI used for indicating the BWP is B2.

Manner 2: The quantity of bits in the DCI is determined based on a maximum bandwidth supported by the first terminal device.

The first terminal device may directly determine the quantity of bits in the DCI based on the maximum bandwidth (or a bandwidth capability) supported by the first terminal device. The maximum bandwidth supported by the first terminal device may be understood as a maximum data transmission bandwidth that can be simultaneously used during data transmission between the first terminal device and the network device. For example, a maximum bandwidth of a REDCAP terminal may be 5 MHz, 10 MHz, or 20 MHz.

For example, a higher bandwidth capability supported by the terminal device indicates that a larger quantity of bits in the DCI may be set, and a lower bandwidth capability supported by the terminal device indicates that a smaller quantity of bits in the DCI may be set.

Manner 3: The quantity of bits in the DCI is determined based on a bandwidth of a control-resource set (CORESET) #0.

The CORESET #0 may be used to search for DCI for scheduling a system information block (SIB). The bandwidth of the CORESET #0 may be represented by using a quantity of resource blocks (RBs). When the bandwidth of the CORESET #0 is different, the quantity of bits in the DCI may be different.

For example, that the quantity of bits in the DCI is determined based on the bandwidth of the CORESET #0 may include: There is a correspondence between the quantity of bits in the DCI and the quantity of RBs of the CORESET #0, or a preset calculation rule is satisfied between the quantity of bits in the DCI and the quantity of RBs of the CORESET #0. For example, the quantity of RBs of the CORESET #0 may be input into a calculation model, to obtain the quantity of bits in the DCI.

For example, there is a correspondence between the quantity of bits in the DCI and the quantity of RBs of the CORESET #0. The bandwidth of the CORESET #0 may be 24 resource blocks (RBs), 48 RBs, or 96 RBs. When the bandwidth of the CORESET #0 is 24 RBs, the quantity of bits in the DCI may be B1. When the bandwidth of the CORESET #0 is 48 RBs, the quantity of bits in the DCI may be B2. When the bandwidth of the CORESET #0 is 96 RBs, the quantity of bits in the DCI may be B3.

It should be noted that, in addition to Manner 3, the quantity of bits in the DCI may alternatively be related to other initial access configuration information. For example, the quantity of bits in the DCI may be related to information about a synchronization signal block (SSB). The information about the SSB includes an index of the SSB, configuration information of a master information block (MIB) carried on a physical broadcast channel (PBCH) in the SSB, configuration information of common search space (CSS) indicated by the PBCH, or the like.

Manner 4. The quantity of bits in the DCI is the same as a quantity of bits in DCI used for scheduling transmission of common information.

The common information may be information broadcast by the network device to the first terminal device before step 301. Specifically, the common information may include a SIB, a paging message (paging), and a random access response (RAR) that are broadcast by the network device.

The SIB may be a system information block 1 (SIB1) used for random access, another SIB, or the like. This is not limited.

Further, in Manner 4, to distinguish between whether the DCI detected by using the same quantity of bits is the DCI used for indicating the BWP or the DCI used for scheduling transmission of the common information, a radio network temporary identifier (RNTI) used to scramble the DCI used for scheduling transmission of the common information is different from an RNTI used to scramble the DCI used for indicating the BWP. When the common information is the SIB broadcast by the network device, an SI-RNTI is used to scramble the DCI used for scheduling transmission of the common information. When the common information is the paging message broadcast by the network device, a P-RNTI is used to scramble the DCI used for scheduling transmission of the common information. When the common information is the random access response broadcast by the network device, a random access radio network temporary identifier (RA-RNTI) is used to scramble the DCI used for scheduling transmission of the common information.

In this way, in Manner 4, the quantity of bits in the DCI used for indicating the BWP is consistent with the quantity of bits in the DCI used for scheduling the common information. In this way, when the first terminal device performs blind detection on the DCI that is sent by the network device and that indicates the BWP, the first terminal device may blindly detect, by using the quantity of bits in the DCI for scheduling the common information, the DCI sent by the network device. Further, the DCI obtained through blind detection is descrambled by using the RNTI corresponding to the DCI for scheduling the common information and the RNTI corresponding to the DCI for indicating the BWP, to obtain the DCI for indicating the BWP. Therefore, regardless of detecting the DCI used for scheduling the information or the DCI for indicating the BWP, the first terminal device may perform detection by using a same decoder, and then distinguish between the two different types of DCI by using the different RNTIs. This reduces complexity and power consumption of detecting the DCI by the first terminal device.

In this embodiment of this application, the DCI that is described in any one of Manner 1 to Manner 4 and that is used for indicating the BWP may have any one of the six DCI formats specified in the protocol, namely, the DCI format 1-0, the DCI format 1-1, the DCI format 1-2, the DCI format 0-1, the DCI format 0-0, or the DCI format 0-2, or may have another DCI format defined in a future protocol. This is not limited. A length and a position of a field included in the DCI for indicating the BWP are the same as a length and a position of a field included in the DCI specified in the protocol. A part or all of bits in a field in the DCI specified in the protocol are used for indicating the BWP, so that the DCI for indicating the BWP may be obtained. To be specific, content indicated by a field at a position in the DCI specified in the protocol may be the same as or different from content indicated by a field at the same position in the DCI for indicating the BWP.

For example, a part or all of bits in one or more of the following fields in the DCI (or DCI format) specified in the protocol may be used as a bit used for indicating the BWP: a downlink assignment index (DAI) field, a physical uplink control channel resource indicator (PUCCH resource indicator) field, a physical downlink shared channel to hybrid automatic repeat request feedback timing indicator (PDSCH-to-HARQ feedback timing indicator) field, or a frequency domain resource assignment field.

In addition to the foregoing fields, a part or all of bits in another field in the DCI (or DCI format) specified in the protocol may alternatively be used as the bit used for indicating the BWP. This is not limited.

The DCI used for indicating the BWP in this embodiment of this application is described in detail by using an example in which the network device determines, in any one of Manner 1 to Manner 4, that the quantity of bits in the DCI used for indicating the BWP and positions of fields in the DCI used for indicating the BWP are the same as a quantity of bits in the DCI format 1-0 scrambled by using a cell radio network temporary identifier (C-RNTI) and positions of fields in the DCI format 1-0.

As shown in Table 1, the DCI format 1-0 may include an identifier for DCI formats (identifier for DCI formats) field, a frequency domain resource assignment field, a time domain resource assignment field, a virtual resource block to physical resource block mapping (VRB-to-PRB mapping) field, a TB 1: modulation and coding scheme (MCS) field, a TB 1: new data indicator (NDI) field, a TB 1: redundancy version (RV) field, an HPN field, a DAI field, a TPC command for scheduled PUCCH field, a PUCCH resource indicator field, and a PDSCH-to-HARQ feedback timing indicator field.

Specifically, when the bandwidth of the CORESET #0 is 24 RBs, the quantity of bits in the DC format 1_0 is 36 bits. When the bandwidth of the CORESET #0 is 48 RBs, the quantity of bits in the DCI format 1_0 is 38 bits. When the bandwidth of the CORESET #0 is 96 RBs, the quantity of bits in the DCI format 1_0 is 40 bits.

TABLE 1

| DCI format 1_0 (C-RNTI) | | | |
|---|---|---|---|
| Bandwidth of the CORESET #0 | 24 RBs | 48 RBs | 96 RBs |
| DCI field — Identifier for DCI formats | 1 | 1 | 1 |
| Frequency domain resource assignment | 9 | 11 | 13 |
| Time domain resource assignment | 4 | 4 | 4 |
| VRB-to-PRB mapping | 1 | 1 | 1 |
| TB 1: MCS | 5 | 5 | 5 |
| TB 1: NDI | 1 | 1 | 1 |
| TB 1: RV | 2 | 2 | 2 |
| HPN | 4 | 4 | 4 |
| DAI | 2 | 7 | 2 |
| TPC command for scheduled PUCCH | 2 | 2 | 7 |
| PUCCH resource indicator | 3 | 3 | 3 |
| PDSCH-to-HARQ feedback timing indicator | 3 | 3 | 3 |

Example (1): Apart or all of bits in the DAI field in the DCI format 1-0 are used for indicating the BWP. A length, a position, and specific indication content of another field remain unchanged, to obtain the DCI for indicating the BWP.

Because the first terminal device may not support a carrier aggregation capability or a carrier aggregation capability supported by the first terminal device is limited, that is, a maximum quantity of HARQ bits that need to be fed back by the first terminal device is limited, a HARQ feedback codebook size may be directly determined in a static codebook manner, and a dynamic HARQ feedback is not implemented by using the DAI field in the DCI format 1-0, to reduce HARQ feedback overheads. The HARQ feedback may include a HARQ-ACK and a HARQ-NACK. Therefore, when the HARQ feedback codebook size is determined in the static codebook manner by default, the DAI field has no indication meaning in the DCI format 1-0, and the DAI field may be used for indicating the BWP.

When all the bits in the DAI field in the DCI format 1-0 are used for indicating the BWP, to obtain the DCI for indicating the BWP, the bit that is in the DCI for indicating the BWP and that is used for indicating the BWP may still be referred to as the DAI field. However, a meaning indicated by the DAI field is different from a meaning indicated by the DCI format 1-0. Alternatively, the bit that is in the DCI for indicating the BWP and that is used for indicating the BWP may be referred to as another field, for example, referred to as a BWP indication field. This is not limited.

For example, the DAI field in the DCI format 1-0 occupies two bits. In this embodiment of this application, both the two bits may be used for indicating the BWP, but a bit field in which the two bits are located is still referred to as the DAI field. Alternatively, a bit field in which the two bits are located may be referred to as the BWP indication field, that is, the DCI does not include the DAI field.

Optionally, a quantity (which is referred to as a HARQ-ACK codebook size for short) of bits in HARQ-ACK information fed back by the first terminal device is set to be fixed. In this way, when the first terminal device needs to feed back, at an uplink moment, uplink HARQ-ACK information corresponding to downlink data transmission included in M downlink slots before the uplink moment, the HARQ-ACK codebook size may be determined in the static codebook manner. To be specific, regardless of whether the M downlink slots include the downlink data transmission, the first terminal device determines the HARQ-ACK codebook size based on a quantity of bits in a HARQ-ACK that corresponds to the M downlink slots and that needs to be fed back. In other words, the HARQ-ACK codebook size=M*the quantity of bits in the HARQ-ACK that corresponds to the downlink slot and that needs to be fed back.

For example, if a quantity of bits in HARQ-ACK information that corresponds to one downlink slot and that needs to be fed back is two, the HARQ-ACK codebook size determined in the static codebook manner is 1*2 bits.

When a part of bits in the DAI field in the DCI format 1-0 are used for indicating the BWP, to obtain the DCI for indicating the BWP, the DAI field is still referred to as the DAI field in the DCI for indicating the BWP. However, a meaning indicated by the DAI field is different from a meaning indicated by the DCI format 1-0. For example, the DCI for indicating the BWP includes the DAI field, the DAI field includes M1 bits, M2 bits in the M1 bits are used for indicating the BWP, and M1-M2 bits are used for indicating other information, for example, indicate, to the first terminal device, a quantity of downlink physical data channels transmitted in a transmission window of the downlink physical data channel. That is, it may be understood as that the M1-M2 bits are actually used for a function of the DAI field.

Alternatively, when a part of bits in the DAI field in the DCI format 1-0 are used for indicating the BWP, the part of bits that are in the DAI field and that are used for indicating the BWP may be referred to as another field, for example, referred to as a BWP indication field. The other bits in the DAI field may still be referred to as the DAI field or the like. This is not limited. For example, the DCI used for indicating the BWP includes the DAI field and the BWP indication field. The DAI field and the BWP indication field include M1 bits in total. The DAI field includes M1-M2 bits, and the BWP indication field includes M2 bits. The BWP indication field is used for indicating the BWP. The DAI field is used for indicating, to the first terminal device, the quantity of downlink physical data channels transmitted in the transmission window of the downlink physical data channel. M1 is a quantity of bits used to send the DAI field to a second terminal device, or M1 is a quantity of bits in the DAI field in the DCI format 1-0. For example, the first terminal device may be understood as a REDCAP terminal, and the second terminal device may be understood as a non-REDCAP terminal device.

For example, the DAI field in the DCI format 1-0 occupies two bits. One of the two bits is used for indicating the BWP, and the other bit is used for indicating the quantity of downlink physical data channels transmitted in the transmission window of the downlink physical data channel. However, a bit field in which the two bits are located is still referred to as the DAI field. Alternatively, the bit used for indicating the BWP is referred to as the BWP indication field, and the other bit is referred to as the DAI field. Alternatively, for the second terminal device, the DAI field in the DCI that includes the BWP indication occupies two bits, and both the two bits are used for indicating the quantity of downlink physical data channels transmitted in the transmission window of the downlink physical data channel. However, for the first terminal device, the DAI field in the DCI that includes the BWP indication may occupy only one bit, and the other bit is used for indicating the BWP.

In Example (1), all or a part of bits in the DAI field in the DCI format 1-0 are used for indicating the BWP. Therefore, when impact on a codebook fed back by the first terminal device is reduced, it is further ensured that the quantity of bits in the DCI is aligned with the quantity of bits in the DCI for scheduling transmission of the common information, so that detection complexity is reduced, and power consumption of the first terminal device is further reduced.

Example (2): A part or all of bits in the PUCCH resource indicator field in the DCI format 1-0 are used for indicating the BWP. A length, a position, and specific indication content of another field remain unchanged, to obtain the DCI for indicating the BWP.

Because the first terminal device, especially a first terminal device that mainly provides an uplink service, for example, a terminal device used in an industrial wireless sensor network (industry wireless sensor network, IWSN), a terminal device used for video surveillance, and an intelligent wearable device such as a smart watch, mainly provides an uplink service, and received downlink data relatively does not occupy a main part. Therefore, a quantity of information bits in a HARQ-ACK fed back for the downlink data is also quite stable, and channel state information (CSI) used to represent downlink channel transmission quality does not need to be fed back excessively frequently. Therefore, information such as the HARQ-ACK and the CSI may be fed back by using a limited PUCCH resource.

When all the bits in the PUCCH resource indicator field in the DCI format 1-0 are used for indicating the BWP, to obtain the DCI for indicating the BWP, the bit that is in the DCI for indicating the BWP and that is used for indicating the BWP may still be referred to as the PUCCH resource indicator field. However, a meaning indicated by the PUCCH resource indicator field is different from a meaning indicated by the DCI format 1-0. Alternatively, the bit that is in the DCI for indicating the BWP and that is used for indicating the BWP may be referred to as another field, for example, referred to as a BWP indication field. This is not limited.

For example, the PUCCH resource indicator field in the DCI format 1-0 occupies three bits. In this embodiment of this application, all the three bits may be used for indicating the BWP, but a bit field in which the three bits are located is still referred to as the PUCCH resource indicator field. Alternatively, a bit field in which the three bits are located may be referred to as the BWP indication field, that is, the DCI does not include the PUCCH resource indicator field.

Further, when all the bits in the PUCCH resource indicator field in the DCI format 1-0 are used for indicating the BWP, the network device may determine that the first terminal device determines that the PUCCH resource is predefined.

When a part of bits in the PUCCH resource indicator field in the DCI format 1-0 are used for indicating the BWP, to obtain the DCI for indicating the BWP, the PUCCH resource indicator field is still referred to as the PUCCH resource indicator field in the DCI for indicating the BWP. However, a meaning indicated by the PUCCH resource indicator field is different from a meaning indicated by the DCI format 1-0. For example, the DCI for indicating the BWP includes the PUCCH resource indicator field, and the PUCCH resource indicator field includes M3 bits. M2 bits in the M3 bits are used for indicating the BWP, and M3-M2 bits are used for indicating other information, for example, indicate a PUCCH resource to the first terminal device. The PUCCH resource includes at least one of the following: a time-frequency resource corresponding to a PUCCH, a PUCCH format used by the first terminal device to feed back HARQ-ACK information on the PUCCH time-frequency resource, whether the first terminal device uses intra-slot frequency hopping transmission when feeding back the HARQ-ACK by using the PUCCH resource, or the like. This is not limited. That is, it may be understood as that the M3-M2 bits are actually used for a function of the PUCCH resource indicator field.

Alternatively, when a part of bits in the PUCCH resource indicator field in the DCI format 1-0 are used for indicating the BWP, the part of bits that are in the PUCCH resource indicator field and that are used for indicating the BWP may be referred to as another field, for example, referred to as a BWP indication field. The other bits in the PUCCH resource indicator field may still be referred to as the PUCCH resource indicator field or the like. This is not limited. For example, the DCI used for indicating the BWP includes the PUCCH resource indicator field and the BWP indication field. The PUCCH resource indicator field and the BWP indication field include M3 bits in total. The PUCCH resource indicator field includes M3-M2 bits, and the BWP indication field includes M2 bits. The BWP indication field is used for indicating the BWP. The PUCCH resource indicator field is used for indicating the PUCCH resource to the first terminal device. M3 is a quantity of bits used to send the PUCCH resource indicator field to a second terminal device. Alternatively, it may be described as that M3 is a quantity of bits in the PUCCH resource indicator field in the DCI format 1-0. For example, the first terminal device may be understood as a REDCAP terminal, and the second terminal device may be understood as a non-REDCAP terminal device.

For example, the PUCCH resource indicator field in the DCI format 1-0 occupies three bits. In this embodiment of this application, one of the three bits may be used for indicating the BWP, and the other two bits are used for indicating the PUCCH resource. Alternatively, two of the three bits are used for indicating the BWP, and the other bit is used for indicating the PUCCH resource. However, a bit field in which the three bits are located is still referred to as the PUCCH resource indicator field. Alternatively, one bit used for indicating the BWP is referred to as the BWP indication field, and the other two bits are referred to as the PUCCH resource indicator field. Alternatively, two bits used for indicating the BWP are referred to as the BWP indication field, and the other bit is referred to as the PUCCH resource indicator field. Alternatively, for the second terminal device, the PUCCH resource indicator field in the DCI including the BWP indication occupies three bits, and all the three bits are used for indicating the PUCCH resource. However, for the first terminal device, the PUCCH resource indicator field in the DCI including the BWP indication may occupy only one bit, and the other two bits are used for indicating the BWP. Alternatively, for the first terminal device, the PUCCH resource indicator field in the DCI including the BWP indication may occupy only two bits, and the other bit is used for indicating the BWP.

Further, when a part of bits in the PUCCH resource indicator field in the DCI format 1-0 are used for indicating the BWP, the foregoing bits used for indicating the PUCCH resource to the first terminal device may dynamically indicate the PUCCH resource with reference to a semi-statically configured PUCCH resource set.

For example, the network device may semi-statically configure two PUCCH resource sets by using RRC signaling, and then indicate, to the first terminal device with reference to the bit that is in the DCI and that is used for indicating the PUCCH resource, a specifically used PUCCH resource set. For example, a quantity of bits used for indicating the PUCCH resource is one. When a value of the bit is 0, the first terminal device is indicated to use a first PUCCH resource set. When the value of the bit is 1, the first terminal device is indicated to use a second PUCCH resource set.

Further, the network device may change the PUCCH resource set through RRC reconfiguration.

In Example (2), all or a part of bits in the PUCCH resource indicator field in the DCI format 1-0 are used for indicating the BWP. Therefore, when impact on the PUCCH resource indicated to the first terminal device is reduced, it is further ensured that the quantity of bits in the DCI is aligned with the quantity of bits in the DCI for scheduling transmission of the common information, so that detection complexity is reduced, and power consumption of the first terminal device is further reduced.

Example (3): A part or all of bits in the PDSCH-to-HARQ feedback timing indicator field in the DCI format 1-0 are used for indicating the BWP. A length, a position, and specific indication content of another field remain unchanged, to obtain the DCI for indicating the BWP.

When all the bits in the PDSCH-to-HARQ feedback timing indicator field in the DCI format 1-0 are used for indicating the BWP, to obtain the DCI for indicating the BWP, the bit that is in the DCI for indicating the BWP and that is used for indicating the BWP may still be referred to as the PDSCH-to-HARQ feedback timing indicator field. However, a meaning indicated by the PDSCH-to-HARQ feedback timing indicator field is different from a meaning indicated by the DCI format 1-0. Alternatively, the bit that is in the DCI for indicating the BWP and that is used for indicating the BWP may be referred to as another field, for example, referred to as a BWP indication field. This is not limited.

For example, the PDSCH-to-HARQ feedback timing indicator field in the DCI format 1-0 occupies three bits. In this embodiment of this application, all the three bits may be used for indicating the BWP, but a bit field in which the three bits are located is still referred to as the PDSCH-to-HARQ feedback timing indicator field. Alternatively, the bit field in which the three bits are located may be referred to as the BWP indication field, that is, the DCI does not include the PDSCH-to-HARQ feedback timing indicator field.

Further, when all the bits in the PDSCH-to-HARQ feed-back timing indicator field in the DCI format 1-0 are used for indicating the BWP, the network device may determine that the first terminal device determines that a PDSCH-to-HARQ feedback timing relationship is predefined.

For example, assuming that the first terminal device receives a PDSCH in a time unit n, the first terminal device may feed back a HARQ-ACK in a time unit n+k, where k is preconfigured.

When a part of bits in the PDSCH-to-HARQ feedback timing indicator field in the DCI format 1-0 are used for indicating the BWP, to obtain the DCI for indicating the BWP, the PDSCH-to-HARQ feedback timing indicator field is still referred to as the PDSCH-to-HARQ feedback timing indicator field in the DCI for indicating the BWP. However, a meaning indicated by the PDSCH-to-HARQ feedback timing indicator field is different from a meaning indicated by the DCI format 1-0. For example, the DCI for indicating the BWP includes the PDSCH-to-HARQ feedback timing indicator field, and the PDSCH-to-HARQ feedback timing indicator field includes M4 bits. M2 bits in the M4 bits are used for indicating the BWP, and M4-M2 bits are used for indicating other information, for example, indicate the PDSCH-to-HARQ feedback timing relationship to the first terminal device. For example, it is assumed that the first terminal device receives a PDSCH in the $n^{th}$ time unit, and it may be determined based on the timing indicator field that a timing delay between the PDSCH and a HARQ feedback to the PDSCH is k time units. The first terminal device may feed back the HARQ in the $(n+k)^{th}$ time unit. That is, it may be understood as that the M4-M2 bits are actually used for a function of the PDSCH-to-HARQ feedback timing indicator field.

Alternatively, when a part of bits in the PDSCH-to-HARQ feedback timing indicator field in the DCI format 1-0 are used for indicating the BWP, the part of bits that are in the PDSCH-to-HARQ feedback timing indicator field and that are used for indicating the BWP may be referred to as another field, for example, referred to as a BWP indication field. The other bits in the PDSCH-to-HARQ feedback timing indicator field may still be referred to as the PDSCH-to-HARQ feedback timing indicator field or the like. This is not limited. For example, the DCI used for indicating the BWP includes the PDSCH-to-HARQ feedback timing indicator field and the BWP indication field. The PDSCH-to-HARQ feedback timing indicator field and the BWP indication field include M4 bits in total. The PDSCH-to-HARQ feedback timing indicator field includes M4-M2 bits, and the BWP indication field includes M2 bits. The BWP indication field is used for indicating the BWP. The PDSCH-to-HARQ feedback timing indicator field is used for indicating the PDSCH-to-HARQ feedback timing relationship to the first terminal device. M4 is a quantity of bits used to send the PDSCH-to-HARQ feedback timing indicator field to a second terminal device. Alternatively, it may be described as that M4 is a quantity of bits in the PDSCH-to-HARQ feedback timing indicator field in the DCI format 1-0. For example, the first terminal device may be understood as a REDCAP terminal, and the second terminal device may be understood as a non-REDCAP terminal device.

For example, the PDSCH-to-HARQ feedback timing indicator field in the DCI format 1-0 occupies three bits. In this embodiment of this application, one of the three bits may be used for indicating the BWP, and the other two bits are used for indicating the PDSCH-to-HARQ feedback timing relationship. Alternatively, two of the three bits are used for indicating the BWP, and the other bit is used for indicating the PDSCH-to-HARQ feedback timing relationship. However, a bit field in which the three bits are located is still referred to as the PDSCH-to-HARQ feedback timing indicator field. Alternatively, one bit used for indicating the BWP is referred to as the BWP indication field, and the other two bits are referred to as the PDSCH-to-HARQ feedback timing indicator field. Alternatively, two bits used for indicating the BWP are referred to as the BWP indication field, and the other bit is referred to as the PDSCH-to-HARQ feedback timing indicator field. Alternatively, for the second terminal device, the PDSCH-to-HARQ feedback timing indicator field in the DCI including the BWP indication occupies three bits, and all the three bits are used for indicating the PDSCH-to-HARQ feedback timing relationship. However, for the first terminal device, the PDSCH-to-HARQ feedback timing indicator field in the DCI including the BWP indication may occupy only one bit, and the other two bits are used for indicating the BWP. Alternatively, for the first terminal device, the PDSCH-to-HARQ feedback timing indicator field in the DCI including the BWP indication may occupy only two bits, and the other bit is used for indicating the BWP.

Further, when a part of bits in the PDSCH-to-HARQ feedback timing indicator field in the DCI format 1-0 are used for indicating the BWP, the foregoing bits used for indicating the PDSCH-to-HARQ feedback timing relationship to the first terminal device may dynamically indicate a time position of the HARQ-ACK feedback with reference to semi-statically PDSCH-to-HARQ-ACK feedback timing.

For example, the network device may semi-statically configure a plurality of PDSCH-to-HARQ-ACK feedback timing values by using RRC signaling, and then indicate, to the first terminal device with reference to the PDSCH-to-HARQ-ACK feedback timing indicator in the DCI, a specifically used PDSCH-to-HARQ-ACK feedback timing value.

For example, the network device may semi-statically configure a plurality of different feedback timing values by using RRC signaling. The feedback timing values may include k1 and k2. It is assumed that a quantity of bits used for indicating the PDSCH-to-HARQ feedback timing relationship is one. When a value of the bit is 0, it is indicated that the feedback timing value is k1. When the value of the bit is 1, it is indicated that the feedback timing value is k2.

Further, the network device may change the feedback timing value through RRC reconfiguration.

In Example (3), all or a part of bits in the PDSCH-to-HARQ feedback timing indicator field in the DCI format 1-0 are used for indicating the BWP. Therefore, when impact on the PDSCH-to-HARQ feedback timing relationship indicated to the first terminal device is reduced, it is further ensured that the quantity of bits in the DCI is aligned with the quantity of bits in the DCI for scheduling transmission of the common information, so that detection complexity is reduced, and power consumption of the first terminal device is further reduced.

Example (4): A part of bits in the frequency domain resource assignment field in the DCI format 1-0 are used for indicating the BWP. A length, a position, and specific indication content of another field remain unchanged, to obtain the DCI for indicating the BWP.

When a part of bits in the frequency domain resource assignment field in the DCI format 1-0 are used for indicating the BWP, to obtain the DCI for indicating the BWP, the frequency domain resource assignment field is still referred to as the frequency domain resource assignment field in the DCI for indicating the BWP. However, a meaning indicated by the frequency domain resource assignment field is different from a meaning indicated by the DCI format 1-0. For example, the DCI for indicating the BWP includes the frequency domain resource assignment field, the frequency domain resource assignment field includes M5 bits, M2 bits in the M5 bits are used for indicating the BWP, and M5-M2 bits are used for indicating other information, for example, indicate an assigned frequency domain resource to the first terminal device.

The CORESET #0 is used as an example. When the bandwidth of the CORESET #0 is 24 RBs, the frequency domain resource assignment field in the DCI format 1-0 occupies 9 bits. When the bandwidth of the CORESET #0 is 48 RBs, the frequency domain resource assignment field in the DCI format 1-0 occupies 11 bits. When the bandwidth of the CORESET #0 is 96 RBs, the frequency domain resource assignment field in the DCI format 1-0 occupies 13 bits.

In a possible design, the quantity of bits used for frequency domain resource assignment is set to 9.

In this way, when the bandwidth of the CORESET #0 is 48 RBs or 96 RBs, the BWP may be indicated by using redundant 2 bits or 4 bits.

It may be understood that, in this possible design, it is considered that the first terminal device supports BWP switching only when the bandwidth of the CORESET #0 is greater than 24 RBs.

In this case, for DCI when the bandwidth of the CORE-SET #0 is 48 RBs, although 9 bits in the 11 bits are used for indicating frequency domain resource assignment, and 2 bits are used for indicating the BWP, a total of the 11 bits are still referred to as the frequency domain resource assignment field. For DCI when the bandwidth of the CORESET #0 is 96 RBs, although 9 bits in the 13 bits are used for indicating the assigned frequency domain resource, and 4 bits are used for indicating the BWP, a total of the 13 bits are still referred to as the frequency domain resource assignment field.

In another possible design, the quantity of bits used for indicating the assigned frequency domain resources is set to X, where X is less than 9.

In this way, when the bandwidth of the CORESET #0 is 24 RBs, 48 RBs, or 96 RBs, the BWP may be indicated by using redundant 9-X bits, 11-X bits, or 13-X bits.

In this case, for DCI when the bandwidth of the CORE-SET #0 is 24 RBs, although X bits in the 9 bits are used for indicating frequency domain resource assignment, and 9-X bits are used for indicating the BWP, a total of the 9 bits are still referred to as the frequency domain resource assignment field. For DCI when the bandwidth of the CORESET #0 is 48 RBs, although X bits in the 11 bits are used for indicating frequency domain resource assignment, and 11-X bits are used for indicating the BWP, a total of the 11 bits are still referred to as the frequency domain resource assignment field. For DCI when the bandwidth of the CORESET #0 is 96 RBs, although X bits in the 13 bits are used for indicating the assigned frequency domain resource, and 13-X bits are used for indicating the BWP, a total of the 13 bits are still referred to as the frequency domain resource assignment field. That is, it may be understood as that the M5-M2 bits are actually used for a function of the PUCCH resource indicator field.

Alternatively, when a part of bits in the frequency domain resource assignment field in the DCI format 1-0 are used for indicating the BWP, the part of bits that are in the frequency domain resource assignment field and that are used for indicating the BWP may be referred to as another field, for example, referred to as a BWP indication field. The other bits in the frequency domain resource assignment field may still be referred to as the frequency domain resource assignment field or the like. This is not limited. For example, the DCI used for indicating the BWP includes the frequency domain resource assignment field and the BWP indication field. The frequency domain resource assignment field and the BWP indication field include M5 bits in total. The frequency domain resource assignment field includes M5-M2 bits, and the BWP indication field includes M2 bits. The BWP indication field is used for indicating the BWP. The frequency domain resource assignment field is used for indicating the assigned frequency domain resource to the first terminal device. M5 is a quantity of bits used to send the frequency domain resource assignment field to a second terminal device. Alternatively, it may be described as that M5 is a quantity of bits in the frequency domain resource assignment field in the DCI format 1-0. For example, the first terminal device may be understood as a REDCAP terminal, and the second terminal device may be understood as a non-REDCAP terminal device.

Still using the CORESET #0 as an example, in a possible design, the quantity of bits used for indicating the assigned frequency domain resource is set to 9.

In this way, when the bandwidth of the CORESET #0 is 48 RBs or 96 RBs, the BWP may be indicated by using redundant 2 bits or 4 bits.

It may be understood that, in this possible design, it is considered that the first terminal device supports BWP switching only when the bandwidth of the CORESET #0 is greater than 24 RBs.

In this case, for DCI when the bandwidth of the CORE-SET #0 is 48 RBs, 9 bits in the 11 bits are used for indicating the assigned frequency domain resource, and 2 bits are used for indicating the BWP. The 9 bits are referred to as the frequency domain resource assignment field, and the other 2 bits are referred to as the BWP indication field. For DCI when the bandwidth of the CORESET #0 is 96 RBs, 9 bits in the 13 bits are used for indicating the assigned frequency domain resource, and 4 bits are used for indicating the BWP. The 9 bits are referred to as the frequency domain resource assignment field, and the other 4 bits are referred to as the BWP indication field. Alternatively, for the second terminal device, the frequency domain resource assignment field in the DCI that includes the BWP indication occupies 11 bits, and all the 11 bits are used for indicating the assigned frequency domain resource. However, for the first terminal device, the frequency domain resource assignment field in the DCI that includes the BWP indication may occupy only 9 bits, and the other 2 bits are used for indicating the BWP. Alternatively, for the second terminal device, the frequency domain resource assignment field in the DCI that includes the BWP indication occupies 13 bits, and all the 13 bits are used for indicating the assigned frequency domain resource. However, for the first terminal device, the frequency domain resource assignment field in the DCI that includes the BWP indication may occupy only 9 bits, and the other 4 bits are used for indicating the BWP.

In another possible design, the quantity of bits used for indicating the assigned frequency domain resources is set to X, where X is less than 9.

In this way, when the bandwidth of the CORESET #0 is 24 RBs, 48 RBs, or 96 RBs, the BWP may be indicated by using redundant 9-X bits, 11-X bits, or 13-X bits.

In this case, for DCI when the bandwidth of the CORE-SET #0 is 24 RBs, X bits in the 9 bits are used for indicating the assigned frequency domain resource, and 9-X bits are used for indicating the BWP. The X bits are referred to as the frequency domain resource assignment field, and the other 9-X bits are referred to as the BWP indication field. For DCI when the bandwidth of the CORESET #0 is 48 RBs, X bits in the 11 bits are used for indicating the assigned frequency domain resource, and 11-X bits are used for indicating the BWP. The X bits are referred to as the frequency domain resource assignment field, and the other 11-X bits are referred to as the BWP indication field. For DCI when the bandwidth of the CORESET #0 is 96 RBs, X bits in the 13 bits are used for indicating the assigned frequency domain resource, and 13-X bits are used for indicating the BWP. The X bits are referred to as the frequency domain resource assignment field, and the other 13-X bits are referred to as the BWP indication field. Alternatively, for the second terminal device, the frequency domain resource assignment field in the DCI that includes the BWP indication occupies 9 bits, and all the 9 bits are used for indicating the assigned frequency domain resource. However, for the first terminal device, the frequency domain resource assignment field in the DCI that includes the BWP indication may occupy only X bits, and the other 9-X bits are used for indicating the BWP. Alternatively, for the second terminal device, the frequency domain resource assignment field in the DCI that includes the BWP indication occupies 11 bits, and all the 11 bits are used for indicating the assigned frequency domain resource. However, for the first terminal device, the frequency domain resource assignment field in the DCI that includes the BWP indication may occupy only X bits, and the other 11-X bits are used for indicating the BWP. Alternatively, for the second terminal device, the frequency domain resource assignment field in the DCI that includes the BWP indication occupies 13 bits, and all the 13 bits are used for indicating the assigned frequency domain resource. However, for the first terminal device, the frequency domain resource assignment field in the DCI that includes the BWP indication may occupy only X bits, and the other 13-X bits are used for indicating the BWP.

In Example (4), a part of bits in the frequency domain resource assignment field in the DCI format 1-0 are used for indicating the BWP. Therefore, when impact on the assigned frequency domain resource indicated to the first terminal device is reduced, it is further ensured that the quantity of bits in the DCI is aligned with the quantity of bits in the DCI for scheduling transmission of the common information, so that detection complexity is reduced, and power consumption of the first terminal device is further reduced.

It should be noted that, in the foregoing Example (1) to Example (4), when M2 is used for indicating the quantity of bits used for indicating the BWP, M2 in the different examples may be the same or different. Alternatively, M2 in some examples is the same, and M2 in some examples is different, or the like. This is not limited.

It should be noted that, in the method shown in FIG. 3, when a part or all of a field in the DCI format specified in the protocol is modified to indicate the BWP to generate the DCI for indicating the BWP, to completely indicate the BWP, a quantity of bits in the modified field is greater than or equal to the quantity of bits for indicating the BWP.

Further, in the method shown in FIG. 3, the network device or the first terminal device may determine, in any one of the following manners, the quantity of bits (which may also be described as the quantity of bits) used for indicating the BWP:

Manner 1: The quantity of bits used for indicating the BWP is predefined.

Specifically, the quantity of bits used for indicating the BWP may be determined in a manner predefined in a standard.

For example, assuming that it is pre-specified in a protocol that the quantity of bits used for indicating the BWP is B1, when the network device sends, to the first terminal device, the DCI used for indicating the BWP, the quantity of bits used for indicating the BWP in the DCI is set to B1.

Manner 2: The quantity of bits used for indicating the BWP is determined based on a maximum quantity of BWPs corresponding to the first terminal device.

Optionally, for the first terminal device, if the maximum quantity of BWPs that can be configured is M, the quantity of bits that are used for indicating the BWP and that are in the DCI may be ceil($\log_2 M$), where ceil(X) indicates an integer that is greater than X and closest to X.

Manner 3: The quantity of bits used for indicating the BWP is determined based on the maximum bandwidth of the first terminal device.

Optionally, for a first terminal device with a lower bandwidth capability, BWP switching is more needed to implement data transmission on different BWPs, so that frequency-domain selective scheduling and reliability of data transmission is ensured. Therefore, for the first terminal device with a lower bandwidth capability, more bits are used for indicating the BWP switching.

For example, the network device may simultaneously serve first terminal devices whose bandwidth capabilities are 5 MHz, 10 MHz, 20 MHz, and 100 MHz. and the quantity of bits that are used for indicating the BWP and that are in the DCI may be determined based on the bandwidth capability of 5 MHz, to ensure reliability of data transmission.

Manner 4: The quantity of bits used for indicating the BWP is determined based on a bandwidth used to transmit the common information.

Still further, the DCI may include a first indication field. The first indication field includes the quantity of bits used for indicating the BWP.

For example, the quantity of bits used for indicating the BWP is two, the first indication field may be set in the DCI, and the first indication field is used for indicating that the quantity of bits used by the first terminal device to indicate the BWP is two.

For example, when the DCI uses Example (1), a part of bits in the DAI field in the DCI format 1-0 may be used for indicating the BWP, and a part of bits are set as the first indication field. Alternatively, when the DCI uses Example (2), a part of bits in the PUCCH resource indicator field in the DCI format 1-0 may be used for indicating the BWP, and a part of bits are set as the first indication field. Alternatively; when the DCI uses Example (3), a part of bits in the PDSCH-to-HARQ feedback timing indicator field in the DCI format 1-0 may be used for indicating the BWP, and a part of bits are set as the first indication field. Alternatively, when the DCI uses Example (4), a part of bits in the frequency domain resource assignment field in the DCI format 1-0 may be used for indicating the BWP, and a part of bits are set as the first indication field. This is not limited.

Optionally, Example (1) to Example (4) may alternatively be described in the following manner.

Case 1: The DCI includes the DAI field, used for indicating the BWP.

Specifically, the case 1 may correspond to related descriptions in Example (1), and details are not described again.

Case 2: The DC includes the PUCCH resource indicator field, used for indicating the BWP.

Specifically, the case 2 may correspond to related descriptions in Example (2), and details are not described again.

Case 3: The DCI includes the PDSCH-to-HARQ feedback timing indicator field, used for indicating the BWP.

Specifically, the case 3 may correspond to related descriptions in Example (3), and details are not described again.

Case 4: The DCI includes the frequency domain resource assignment field, used for indicating the BWP.

Specifically, the case 4 may correspond to related descriptions in Example (4), and details are not described again.

Case 5: The DCI includes the BWP indication field, used for indicating the BWP.

Specifically, the case 5 may correspond to related descriptions in Example (1), Example (2), Example (3), and Example (4), and details are not described again.

Further, the network device may further send second indication information to the first terminal device.

The second indication information is used for indicating one of a plurality of candidate cases, to indicate the BWP to the first terminal device. The plurality of candidate cases include at least two of the case 1 to the case 5.

For example, the network device sends the second indication information to the first terminal device. The second indication information is used for indicating that the DCI format is the format described in the case 1. In this way, after receiving the second indication information, the first terminal device may determine to determine the BWP based on the DAI field.

Still further, the network device may further configure, in the USS corresponding to the first terminal device, only a DCI format with the quantity of bits in the DCI (or the quantity of bits in the DCI), so that the first terminal device detects received DCI based on the DCI format. The first terminal device may detect matched DCI based on the DCI format, to reduce detection complexity.

If a quantity of bits in the received DCI is the same as the quantity of bits in the preconfigured DCI format, it is considered that the DCI matches the DCI format. Otherwise, the DCI does not match the DCI format.

It should be noted that the foregoing embodiments are mainly for downlink control information used for scheduling a downlink physical channel. When downlink control information used for scheduling an uplink physical channel is considered, a padding bit or another bit in the uplink control information may be used for implementation. This is not limited.

For example, to reduce complexity of detecting the PDCCH by the first terminal device, a size of a DCI format corresponding to the downlink control information used for scheduling the downlink physical channel may be the same as a size of a DCI format corresponding to the downlink control information used for scheduling the uplink physical channel.

Specifically, when accessing a network, the first terminal device may first determine a size of downlink control information. To enable a size of a DCI format corresponding to uplink control information to be the same as a size of a DCI format corresponding to the downlink control information, when the size of the uplink control information is less than the size of the downlink control information, the size of the uplink control information may be the same as the size of the downlink control information in a manner of padding a bit. Alternatively, when the size of the uplink control information is greater than the size of the downlink control information, the size of the uplink control information may be the same as the size of the downlink control information in a manner of puncturing (puncture). Therefore, in this embodiment of this application, the padding bit in the uplink control information may be further used for indicating the BWP, to implement BWP switching. Alternatively, when the size of the uplink control information is the same as the size of the downlink control information in the manner of puncturing. BWP switching may be implemented by using the method shown in the foregoing embodiments. For example, a size of a frequency domain resource assignment control field in the uplink control information may be set to a fixed value.

In embodiments of this application, for example, when sending DCI to UE, a base station may perform, on the DCI, the following operation 1 and at least one of an operation 2 to an operation 6. Correspondingly, when receiving the DCI, the UE may perform a corresponding reverse operation, for example, padding, adding a punctured information bit, descrambling, channel decoding, and/or demodulation. Details are not described herein.

Operation 1: Obtain the DCI based on a format corresponding to the DCI.

An information bit in the DCI may be referred to as an original bit stream of the DCI.

Optionally, operation 2: Puncture or pad an input bit stream, to obtain a punctured or padded bit stream.

The input bit stream may be the original bit stream.

In embodiments of this application, types and a quantity of punctured information fields are not limited. For example, the punctured information field may be one or more of the following information fields: a frequency domain resource assignment field, a time domain resource assignment field, an MCS, and another possible information field.

Optionally, operation 3: Add a CRC parity bit to an input bit stream, to obtain a CRC bit stream. The CRC parity bit may be used by the UE to perform error detection. The input bit stream in the operation 3 may be the original bit stream, or may be a punctured or padded bit stream.

Optionally, operation 4: Perform channel coding on an input bit stream, to obtain a channel coded bit stream. A channel coding method may be low density parity check code (LDPC), polar code, or turbo code. A coding rate may be a real number greater than 0, such as $\frac{1}{2}$, $\frac{1}{3}$, or $\frac{2}{3}$. Optionally, the channel coding operation may further include a rate matching operation. The rate matching operation may be understood as that the UE performs, based on a quantity of resources corresponding to data transmission and a modulation order of the data transmission, the rate matching operation on an output bit stream obtained after channel coding, to obtain an output bit stream that matches the resources and the modulation order of the data transmission. The input bit stream in the operation 4 may be the original bit stream, a punctured or padded bit stream, or a CRC bit stream.

Optionally, operation 5: Scramble an input bit stream based on a scrambling sequence, to obtain a scrambled bit stream. The scrambling operation may be performed to reduce inter-cell interference. The input bit stream in the operation 5 may be the original bit stream, a punctured or padded bit stream, a CRC bit stream, or a channel coded bit stream.

Optionally, operation 6: Modulate an input bit stream, to obtain a modulated symbol. A modulation method may be QAM modulation, and a modulation order may be 16-QAM, 64-QAM, 128-QAM, or the like. This is not limited in embodiments of this application. The input bit stream in the operation 6 may be the original bit stream, a punctured or padded bit stream, a CRC bit stream, a channel coded bit stream, or a scrambled bit stream.

In this application, that quantities of bits in different DCI (for example, DCI A and DCI B) are the same or aligned may include any one of the following several cases.

(1) A quantity of bits in an original bit stream of the DCI A is the same as a quantity of bits in an original bit stream of the DCI B. In embodiments of this application, the original bit stream of the DCI may also be referred to as an information bit stream of the DCI.

(2) A quantity of bits in a punctured or padded bit stream of the DCI A is the same as a quantity of bits in a punctured or padded bit stream of the DCI B.

(3) A quantity of bits in an original bit stream of the DCI A is the same as a quantity of bits in a punctured or padded bit stream of the DCI B.

(4) A first operation is performed on the DCI A, to obtain a first bit stream. The first operation is performed on the DCI B, to obtain a second bit stream. A quantity of bits in the first bit stream is the same as a quantity of bits in the second bit stream. The first operation may include, adding CRC; adding CRC and channel coding; adding CRC and scrambling; or adding CRC, channel coding, and scrambling. Optionally, for the DCI A, the DCI B. or the DCI A and the DCI B, the first operation may further include puncturing or padding.

(5) A second operation is performed on the DCI A, to obtain a first group of modulation symbols. The second operation is performed on the DCI B, to obtain a second group of modulation symbols. A quantity of symbols in the first group of modulation symbols is the same as a quantity of symbols in the second group of modulation symbols. The second operation may include: modulation; adding CRC and modulation; channel coding and modulation; scrambling and modulation; adding CRC, channel coding, and modulation: adding CRC, scrambling, and modulation; or adding CRC, channel coding, scrambling, and modulation. Optionally, for the DCI A, the DCI B, or the DCI A and the DCI B, the second operation may further include puncturing or padding.

The foregoing mainly describes the solutions provided in embodiments of this application from a perspective of interaction between nodes. It can be understood that, to implement the foregoing functions, the nodes such as the network device and the first terminal device include corresponding hardware structures and/or software modules for executing the functions. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the network device and the first terminal device may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

FIG. 4 is a diagram of a structure of a communication apparatus 40. The communication apparatus 40 may be a network device, a chip in the network device, a system-on-a-chip, another apparatus that can implement the functions of the network device in the foregoing methods, or the like. The communication apparatus 40 may be configured to perform the functions of the network device in the foregoing method embodiments. In an implementation, the communication apparatus 40 shown in FIG. 4 includes a sending unit 401.

In a possible design, the sending unit 401 is configured to send, to a first terminal device, DCI used for indicating a BWP. A quantity of bits in the DCI is a fixed quantity of bits. The DCI is used for scheduling a physical data channel. The BWP is used to transmit the physical data channel.

Specifically, all related content of each step involved in the foregoing method embodiment shown in FIG. 3 may be referenced to a function description of a corresponding functional module, and details are not described herein again. The communication apparatus 40 is configured to perform the functions of the network device in the control information transmission method shown in FIG. 3, and therefore can achieve a same effect as the foregoing control information transmission method.

In another implementation, the communication apparatus 40 shown in FIG. 4 includes a processing module and a communication module. The processing module is configured to control and manage an action of the communication apparatus 40. The communication module may integrate a function of the sending unit 401, and may be configured to support the communication apparatus 40 in performing a step such as step 301 and communicating with another network entity, for example, communicating with a function module or a network entity shown in FIG. 1b. The communication apparatus 40 may further include a storage module, configured to store instructions and/or data. When the instructions are executed by the processing module, the processing module may be enabled to implement the foregoing method on the network device side.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 40 in this embodiment of this application may be the communication apparatus shown in FIG. 2.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store instructions and/or data.

Figure 5:
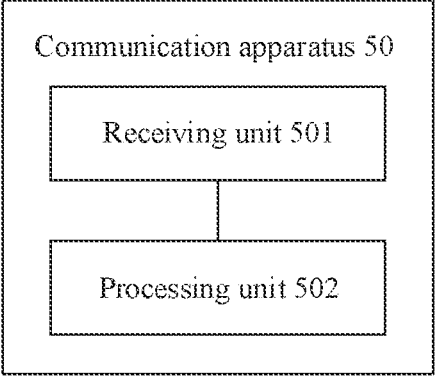
FIG. 5 is a schematic composition diagram of a communication apparatus 50 according to an embodiment of this application.

FIG. 5 is a diagram of a structure of a communication apparatus 50. The communication apparatus 50 may be a first terminal device, a chip in the first terminal device, a system-on-a-chip, another apparatus that can implement the functions of the first terminal device in the foregoing methods, or the like. The communication apparatus 50 may be configured to perform the functions of the first terminal device in the foregoing method embodiments. In a possible implementation, the communication apparatus 50 shown in FIG. 5 includes a receiving unit 501 and a processing unit 502.

In a possible design, the receiving unit 501 is configured to receive DCI from a network device. A quantity of bits in the DCI is a fixed quantity of bits. The DCI is used for scheduling a physical data channel. The DCI is used for indicating a BWP. The BWP is used to transmit the physical data channel.

In a possible design, the processing unit 502 is configured to schedule the physical data channel based on the DCI.

Specifically, all related content of each step involved in the foregoing method embodiment shown in FIG. 3 may be referenced to a function description of a corresponding functional module, and details are not described herein again. The communication apparatus 50 is configured to perform the functions of the first terminal device in the control information transmission method shown in FIG. 3, and therefore can achieve a same effect as the foregoing control information transmission method.

In another implementation, the communication apparatus 50 shown in FIG. 5 includes a processing module and a communication module. The processing module is configured to control and manage an action of the communication apparatus 50. The processing module may integrate a function of the processing unit 502. The communication module may integrate a function of the receiving unit 501, and may be configured to support the communication apparatus 50 in performing a step such as step 302 and communicating with another network entity, for example, communicating with a function module or a network entity shown in FIG. 1*b*. The communication apparatus 50 may further include a storage module, configured to store instructions and/or data. When the instructions are executed by the processing module, the processing module may be enabled to implement the foregoing method on the first terminal device side.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 50 in this embodiment of this application may be the communication apparatus shown in FIG. 2.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store instructions and/or data.

Figure 6:
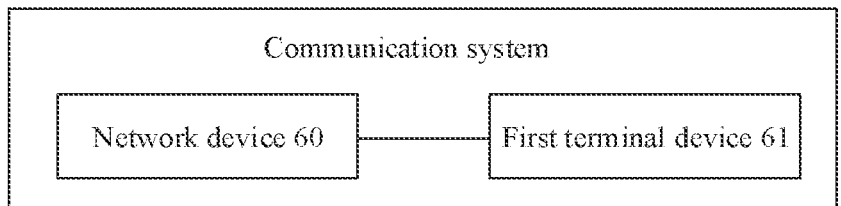
FIG. 6 is a schematic composition diagram of a communication system according to an embodiment of this application.

FIG. 6 is a diagram of a structure of a communication system according to an embodiment of this application. As shown in FIG. 6, the communication system may include a network device 60 and a first terminal device 61.

The network device 60 may have a function of the foregoing communication apparatus 40. The first terminal device 61 may have a function of the foregoing communication apparatus 50.

For example, the network device 60 is configured to send, to the first terminal device. DCI used for indicating a BWP. A quantity of bits in the DCI is a fixed quantity of bits. The DCI is used for scheduling a physical data channel. The BWP is used to transmit the physical data channel.

The first terminal device 61 is configured to receive the DCI from the network device, where the quantity of bits in the DCI is the fixed quantity of bits, the DCI is used for scheduling the physical data channel, the DCI is used for indicating the BWP, and the BWP is used to transmit the physical data channel; and schedule the physical data channel based on the DCI.

Specifically, for a specific implementation process of the network device 60, refer to an execution process of the network device in the method embodiment in FIG. 3. Details are not described herein again. For a specific implementation process of the first terminal device 61, refer to an execution process of the first terminal device in the method embodiment in FIG. 3. Details are not described herein again.

An embodiment of this application further provides a computer-readable storage medium. All or some of the procedures in the foregoing method embodiments may be completed by a computer program instructing related hardware. The program may be stored in the computer-readable storage medium. When the program is executed, the procedures of the foregoing method embodiments may be included. The computer-readable storage medium may be an internal storage unit in the communication apparatus, for example, including a data transmit end and/or a data receive end, in any one of the foregoing embodiments, for example, a hard disk or a memory of the communication apparatus. Alternatively, the computer-readable storage medium may be an external storage device of the communication apparatus, for example, a plug-in hard disk, a smart media card (SMC), a secure digital (SD) card, or a flash card that is configured on the communication apparatus. Further, the computer-readable storage medium may include both the internal storage unit and the external storage device of the communication apparatus. The computer-readable storage medium is configured to store the computer program and other programs and data that are required by the communication apparatus. The computer-readable storage medium may be further configured to temporarily store data that has been output or is to be output.

An embodiment of this application further provides computer instructions. All or some of the procedures in the foregoing method embodiments may be implemented by the computer instructions instructing related hardware (such as a computer, a processor, a network device, and a terminal). The program may be stored in the foregoing computer-readable storage medium.

It should be noted that, in the specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more. "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

The foregoing descriptions about implementations allow a person skilled in the art to understand that, for the purpose of convenient and brief description, division of the foregoing functional modules is taken as an example for illustration. In actual application, the foregoing functions can be assigned to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A control information transmission method, comprising:

receiving downlink control information (DCI) from a
network device, wherein
a quantity of bits in the DCI is a fixed quantity of bits, the
DCI is used for scheduling a physical data channel, the
DCI indicates a bandwidth part (BWP), and the BWP
is used to transmit the physical data channel, wherein
the quantity of bits in the DCI is determined based on
a bandwidth of a control-resource set (CORESET) #0,
and wherein the quantity of bits in the DCI is further
related to an index of a synchronization signal block
(SSB), configuration information of a master informa-
tion block (MIB) carried on a physical broadcast chan-
nel (PBCH) in the SSB, or configuration information of
common search space (CSS) indicated by the PBCH.
2. The method according to claim 1, wherein
the DCI comprises a downlink assignment index (DAI)
field, wherein the DAI field indicates the BWP; or
the DCI does not comprise a downlink assignment index
(DAI) field.
3. The method according to claim 1, wherein
the DCI comprises a downlink assignment index (DAI)
field, wherein the DAI field comprises M1 bits, M2 bits
in the M1 bits indicate the BWP, and M1 is a quantity
of bits used when the network device sends the DAI
field to a second terminal device.
4. The method according to claim 1, wherein
the DCI comprises a downlink assignment index (DAI)
field and a BWP indication field, wherein the DAI field
comprises M1-M2 bits, the BWP indication field com-
prises M2 bits, the BWP indication field indicates the
BWP, the DAI field indicates a quantity of downlink
physical data channels transmitted in a transmission
window of the downlink physical data channel, and M1
is a quantity of bits used when the network device sends
the DAI field to a second terminal device.
5. The method according to claim 1, wherein
the DCI comprises a physical uplink control channel
(PUCCH) resource indicator field, wherein the PUCCH
resource indicator field indicates the BWP; or
the DCI does not comprise a physical uplink control
channel (PUCCH) resource indicator field.
6. The method according to claim 1, wherein
the DCI comprises a physical uplink control channel
(PUCCH) resource indicator field and a BWP indica-
tion field, wherein the PUCCH resource indicator field
comprises M3-M2 bits, the BWP indication field com-
prises M2 bits, the BWP indication field indicates the
BWP, the PUCCH resource indicator field indicates a
PUCCH resource, and M3 is a quantity of bits used
when the network device sends the PUCCH resource
indicator field to a second terminal device.
7. An apparatus, comprising:
one or more processors; and
a memory having instructions stored thereon that, when
executed by the one or more processors, cause the
apparatus to:
receive downlink control information (DCI) from a net-
work device, wherein
a quantity of bits in the DCI is a fixed quantity of bits, the
DCI is used for scheduling a physical data channel, the
DCI indicates a bandwidth part (BWP), and the BWP
is used to transmit the physical data channel, wherein
the quantity of bits in the DCI is determined based on
a bandwidth of a control-resource set (CORESET) #0,
and wherein the quantity of bits in the DCI is further
related to an index of a synchronization signal block
(SSB), configuration information of a master information block (MIB) carried on a physical broadcast chan-
nel (PBCH) in the SSB, or configuration information of
common search space (CSS) indicated by the PBCH.
8. The apparatus according to claim 7, wherein
the DCI comprises a downlink assignment index (DAI)
field, wherein the DAI field indicates the BWP; or
the DCI does not comprise a downlink assignment index
(DAI) field.
9. The apparatus according to claim 7, wherein
the DCI comprises a downlink assignment index (DAI)
field, wherein the DAI field comprises M1 bits, M2 bits
in the M1 bits indicate the BWP, and M1 is a quantity
of bits used when the network device sends the DAI
field to a second terminal device.
10. The apparatus according to claim 7, wherein
the DCI comprises a downlink assignment index (DAI)
field and a BWP indication field, wherein the DAI field
comprises M1-M2 bits, the BWP indication field com-
prises M2 bits, the BWP indication field indicates the
BWP, the DAI field indicates a quantity of downlink
physical data channels transmitted in a transmission
window of the downlink physical data channel, and M1
is a quantity of bits used when the network device sends
the DAI field to a second terminal device.
11. The apparatus according to claim 7, wherein
the DCI comprises a physical uplink control channel
(PUCCH) resource indicator field, wherein the PUCCH
resource indicator field indicates the BWP; or
the DCI does not comprise a physical uplink control
channel (PUCCH) resource indicator field.
12. The apparatus according to claim 7, wherein
the DCI comprises a physical uplink control channel
(PUCCH) resource indicator field and a BWP indica-
tion field, wherein the PUCCH resource indicator field
comprises M3-M2 bits, the BWP indication field com-
prises M2 bits, the BWP indication field indicates the
BWP, the PUCCH resource indicator field indicates a
PUCCH resource, and M3 is a quantity of bits used
when the network device sends the PUCCH resource
indicator field to a second terminal device.
13. A non-transitory computer readable medium, wherein
the non-transitory computer readable medium stores instruc-
tions that are executable by a computer, and the instructions
comprise instructions for:
receiving downlink control information (DCI) from a
network device, wherein
a quantity of bits in the DCI is a fixed quantity of bits, the
DCI is used for scheduling a physical data channel, the
DCI indicates a bandwidth part (BWP), and the BWP
is used to transmit the physical data channel, wherein
the quantity of bits in the DCI is determined based on
a bandwidth of a control-resource set (CORESET) #0,
and wherein the quantity of bits in the DCI is further
related to an index of a synchronization signal block
(SSB), configuration information of a master informa-
tion block (MIB) carried on a physical broadcast chan-
nel (PBCH) in the SSB, or configuration information of
common search space (CSS) indicated by the PBCH.
14. The non-transitory computer readable medium
according to claim 13, wherein
the DCI comprises a downlink assignment index (DAI)
field, wherein the DAI field indicates the BWP; or
the DCI does not comprise a downlink assignment index
(DAI) field.
15. The non-transitory computer readable medium
according to claim 13, wherein the DCI comprises a downlink assignment index (DAI) field, wherein the DAI field comprises M1 bits, M2 bits in the M1 bits indicate the BWP, and M1 is a quantity of bits used when the network device sends the DAI field to a second terminal device.

16. The non-transitory computer readable medium according to claim 13, wherein the DCI comprises a downlink assignment index (DAI) field and a BWP indication field, wherein the DAI field comprises M1-M2 bits, the BWP indication field comprises M2 bits, the BWP indication field indicates the BWP, the DAI field indicates a quantity of downlink physical data channels transmitted in a transmission window of the downlink physical data channel, and M1 is a quantity of bits used when the network device sends the DAI field to a second terminal device.

17. The non-transitory computer readable medium according to claim 13, wherein the DCI comprises a physical uplink control channel (PUCCH) resource indicator field, wherein the PUCCH resource indicator field indicates the BWP; or the DCI does not comprise a physical uplink control channel (PUCCH) resource indicator field.

18. The non-transitory computer readable medium according to claim 15, wherein the DCI comprises a physical uplink control channel (PUCCH) resource indicator field and a BWP indication field, wherein the PUCCH resource indicator field comprises M3-M2 bits, the BWP indication field comprises M2 bits, the BWP indication field indicates the BWP, the PUCCH resource indicator field indicates a PUCCH resource, and M3 is a quantity of bits used when the network device sends the PUCCH resource indicator field to a second terminal device.

* * * * *